(12) United States Patent
Federici et al.

(10) Patent No.: US 11,709,139 B2
(45) Date of Patent: Jul. 25, 2023

(54) SYSTEMS AND METHODS OF DETECTING PIPE DEFECTS

(71) Applicants: New Jersey Institute of Technology, Newark, NJ (US); Northeast Gas Association, Parsippany, NJ (US)

(72) Inventors: John F. Federici, Westfield, NJ (US); Louis Rizzo, Toms River, NJ (US); Ian Gatley, Fairport, NY (US); Samuel Gatley, Fairport, NY (US); Joseph Maillia, Palmyra, NY (US)

(73) Assignee: New Jersey Institute of Technology, Newark, NJ (US)

( * ) Notice: Subject to any disclaimer, the term of this patent is extended or adjusted under 35 U.S.C. 154(b) by 109 days.

(21) Appl. No.: 17/354,389

(22) Filed: Jun. 22, 2021

(65) Prior Publication Data

US 2022/0026372 A1 Jan. 27, 2022

Related U.S. Application Data

(60) Provisional application No. 63/056,037, filed on Jul. 24, 2020.

(51) Int. Cl.
*G01N 21/88* (2006.01)
*G01N 21/3581* (2014.01)
*G01M 3/38* (2006.01)

(52) U.S. Cl.
CPC .......... *G01N 21/8806* (2013.01); *G01M 3/38* (2013.01); *G01N 21/3581* (2013.01); *G01N 2021/8809* (2013.01)

(58) Field of Classification Search
CPC .......... G01N 21/8806; G01N 21/3581; G01N 2021/8809; G01N 21/23; G01N 2021/8848; G01N 21/21; G01N 21/952; G01M 3/38

See application file for complete search history.

(56) References Cited

U.S. PATENT DOCUMENTS

| 7,906,975 B2 * | 3/2011 | Federici | G01N 33/146 |
| | | | 250/341.1 |
| 8,237,452 B2 * | 8/2012 | Federici | G01N 33/146 |
| | | | 250/341.1 |

(Continued)

OTHER PUBLICATIONS

Wietzke, et al., Terahertz Imaging: A New Non-Destructive Technique for the Quality Control of Plastic Weld Joints. Journal of the European Optical Society, 2007. 2.

(Continued)

*Primary Examiner* — David P Porta
*Assistant Examiner* — Djura Malevic
(74) *Attorney, Agent, or Firm* — McCarter & English, LLP

(57) ABSTRACT

An example system for detecting pipe defects is provided. The system includes a transmitter, a receiver and a processing device. The transmitter is oriented to transmit Terahertz (THz) waveform pulses towards at least one of an outer surface of a pipe or an inner surface of the pipe. The receiver is oriented to receive reflected Terahertz (THz) waveform pulses from at least one of the outer surface of the pipe or the inner surface of the pipe. The processing device configured is to receive as input the Terahertz (THz) waveform pulses transmitted from the transmitter and the reflected Terahertz (THz) waveform pulses received by the receiver and, based on the received input, determine if a defect in the pipe exists.

17 Claims, 25 Drawing Sheets

(56) References Cited

U.S. PATENT DOCUMENTS

| | | | |
|---|---|---|---|
| 9,423,358 B1* | 8/2016 | Hunt | G01N 21/95 |
| 9,518,918 B2* | 12/2016 | Mann | G01N 21/3581 |
| 9,733,181 B2* | 8/2017 | Mann | G01N 21/4738 |
| 9,874,516 B2* | 1/2018 | Mann | G01N 17/006 |
| 9,927,354 B1* | 3/2018 | Starr | G01N 21/3581 |
| 10,248,003 B2* | 4/2019 | Akiyama | G02F 1/3613 |
| 10,514,336 B2* | 12/2019 | Thiel | G01B 11/24 |
| 10,584,957 B2* | 3/2020 | Thiel | G01B 11/0691 |
| 10,684,119 B2* | 6/2020 | Sikora | G01B 11/0625 |
| 10,753,727 B2* | 8/2020 | Klose | G01B 21/047 |
| 10,753,866 B2* | 8/2020 | Klose | G01N 21/3581 |
| 10,937,144 B2* | 3/2021 | Starr | G06V 10/82 |
| 10,989,523 B2* | 4/2021 | Georgeson | G01B 11/165 |
| 11,085,874 B2* | 8/2021 | Pourkazemi | G01B 11/06 |
| 11,099,001 B2* | 8/2021 | Ochiai | G01N 21/17 |
| 11,442,159 B2* | 9/2022 | Babakhani | G01S 7/032 |
| 11,456,771 B1* | 9/2022 | Bennett | H04B 1/40 |
| 2007/0235650 A1* | 10/2007 | Federici | G01N 21/636 250/341.8 |
| 2008/0180111 A1* | 7/2008 | Federici | G01N 21/909 324/639 |
| 2011/0127432 A1* | 6/2011 | Federici | G01N 33/146 250/341.1 |
| 2012/0037804 A1* | 2/2012 | Federici | G01N 21/3586 250/341.1 |
| 2014/0183365 A1* | 7/2014 | Kyriakis | B29C 48/09 250/347 |
| 2015/0362428 A1* | 12/2015 | Federici | G01N 33/36 702/104 |
| 2016/0003734 A1* | 1/2016 | Mann | G01N 21/3563 250/339.05 |
| 2016/0139082 A1* | 5/2016 | Ross | B29C 66/1224 73/588 |
| 2016/0265901 A1* | 9/2016 | Kyriakis | G01B 11/2433 |
| 2016/0305869 A1* | 10/2016 | Mann | G01N 21/3581 |
| 2017/0023354 A1* | 1/2017 | Stich | G01B 11/06 |
| 2017/0248833 A1* | 8/2017 | Akiyama | C07C 309/30 |
| 2017/0336323 A1* | 11/2017 | Mann | G01N 21/55 |
| 2018/0038681 A1* | 2/2018 | Van Mechelen | G01B 11/0683 |
| 2018/0066935 A1* | 3/2018 | Burdette | G01J 3/453 |
| 2018/0112973 A1* | 4/2018 | Sikora | G01J 5/10 |
| 2018/0194055 A1* | 7/2018 | Nerling | B29C 44/60 |
| 2018/0347963 A1* | 12/2018 | Thiel | G01N 21/3586 |
| 2019/0078873 A1* | 3/2019 | Saeedkia | G01S 13/10 |
| 2019/0107485 A1* | 4/2019 | Thiel | G01B 11/24 |
| 2019/0139215 A1* | 5/2019 | Starr | G06K 9/6257 |
| 2019/0234872 A1* | 8/2019 | Ochiai | G01B 15/02 |
| 2019/0301853 A1* | 10/2019 | Klose | G01S 13/88 |
| 2019/0331476 A1* | 10/2019 | Ochiai | G01B 11/06 |
| 2019/0331594 A1* | 10/2019 | Klose | G01N 21/952 |
| 2019/0383599 A1* | 12/2019 | Gregory | G01B 11/0625 |
| 2020/0103341 A1* | 4/2020 | Ochiai | G01N 21/3586 |
| 2020/0173766 A1* | 6/2020 | Thiel | G01N 21/3581 |
| 2020/0249156 A1* | 8/2020 | Wu | G06N 20/00 |
| 2020/0292302 A1* | 9/2020 | Georgeson | G01B 11/165 |
| 2021/0018610 A1* | 1/2021 | Babakhani | G01S 7/032 |
| 2021/0056678 A1* | 2/2021 | Al Shehri | G06N 3/084 |
| 2021/0172727 A1* | 6/2021 | Sikora | G01B 11/08 |
| 2021/0183050 A1* | 6/2021 | Starr | G06V 10/764 |
| 2021/0247306 A1* | 8/2021 | Klose | G01N 21/3581 |
| 2021/0381828 A1* | 12/2021 | Klose | G01B 15/04 |
| 2022/0026372 A1* | 1/2022 | Federici | G01N 21/8806 |
| 2022/0057333 A1* | 2/2022 | Klose | G01N 21/3581 |
| 2022/0341217 A1* | 10/2022 | Cristache | E05B 47/0004 |

OTHER PUBLICATIONS

Wietzke, et al., Terahertz Spectroscopy A Powerful Tool for the Characterization of Plastic Materials, in 2010 International Conference on Solid Dielectrics, Potsdam, Germany, p. 1-4, 2010.

Tsuguhiro, Observation of Cavity Interface and Mechanical Stress in Opaque Material by THz Wave. Behavior of Electromagnetic Waves in Different Media and Structures, 2011.

Kusano, et al., Mid-Infrared Pulsed Laser Ultrasonic Testing for Carbon Fiber Reinforced Plastics, Ultrasonics, 2018. 84: p. 310-318.

Zhong, Progress in Terahertz Nondestructive Testing: A Review. Frontiers of Mechanical Engineering, 2018: p. 1-9.

* cited by examiner

Beam Propagation

Region of Interest

SYSTEMS AND METHODS OF DETECTING PIPE DEFECTS

CROSS-REFERENCE TO RELATED APPLICATIONS

This application claims the benefit of U.S. Provisional Patent Application No. 63/056,037, which was filed on Jul. 24, 2020. The entire content of the foregoing provisional patent application is incorporated herein by reference.

BACKGROUND

In the gas industry, polyethylene (PE) pipes are generally used for underground applications. PE gas pipes can be joined together by butt weld fusion methods. During butt weld fusion, adjacent sections of PE pipe are pressed against a hot plate placed between the respective sections. Once the plastic pipe ends have been heated to the requisite temperature, the plate is removed and the pipe ends are pushed together to "butt weld" them to each other. As the plastic pipe ends cool, the melted plastic joins the pipe ends to each other. As shown in FIG. 1, a curved bevel 10 is formed by the melted plastic at the joint between the pipe ends 12, 14 after the fusion process.

An ideal weld is expected to have a long lifetime (e.g., decades). However, problems can occur during the butt weld fusion process that reduce the longevity of the weld. In some instances, contaminants (e.g., sand, air gaps, delamination, combinations thereof, or the like) within the weld can compromise the pipe joint. In some instances, applying non-ideal pressure (e.g., inadequate pressure (under pressure) or excessive pressure (over pressure)) during the pipe fusion process can have detrimental effects on the weld. In some instances, cold fusion in pipe joints can occur (e.g., pipes that appear to have fused together properly but are not actually welded along the contacting surfaces or areas within the joint). Such issues with butt weld fusion of pipe ends can be difficult or nearly impossible to detect, resulting in potentially hazardous gas leaks.

SUMMARY

Embodiments of the present disclosure provide exemplary systems and methods of detecting pipe defects. The exemplary systems provide non-destructive evaluation (NDE) means to detect the presence of defects in the form of, e.g., contaminants in the joint, over pressure, under pressure, cold fusion joints, combinations thereof, or the like. The exemplary systems can be used to test the pipe joint immediately or soon after butt fusion welding of the pipe sections, prior to installation of the piping in the field, or after installation of the piping in the field. In some embodiments, detecting the defects immediately after butt fusion welding pipe sections and before use of the piping can help ensure expected lifetime of PE gas pipes and can eliminate the need for expensive repairs that require excavation due to gas leaks.

The exemplary systems ensure PE pipe joint integrity by utilizing Terahertz (THz) spectroscopy and imaging for non-destructive evaluation or testing of PE pipe joints. Due to the curvature of the bevel that forms during the butt weld fusion process, traditional THz inspection methods, such as collinear transmission or reflection measurements, do not prove feasible defect detection within the pipe weld. The exemplary systems allow for THz inspection methods for defect detection within the fusion welds of the pipe. The exemplary THz NDE methods can also be used to measure stresses in the pipes and pipe joints that affect pipe joint stability and can assist in identifying cold fusion pipe joints.

In accordance with embodiments of the present disclosure, an exemplary system for detecting pipe defects is provided. The system includes a transmitter, a receiver, and a processing device. The transmitter is oriented to transmit Terahertz (THz) waveform pulses towards at least one of an outer surface of a pipe or an inner surface of the pipe (e.g., at an area of the pipe offset from the pipe joint, at the pipe joint, combinations thereof, or the like). The receiver is oriented to receive reflected Terahertz (THz) waveform pulses from at least one of the outer surface of the pipe, the inner surface of the pipe, the pipe joint, combinations thereof, or the like. The processing device is configured to receive as input the Terahertz (THz) waveform pulses transmitted from the transmitter and the reflected Terahertz (THz) waveform pulses received by the receiver. Based on the received input, the processing device can determine if a defect in the pipe exists.

In some embodiments, the system can include a beamsplitter. In such embodiments, the transmitter can be oriented to transmit the Terahertz (THz) waveform pulses through the beamsplitter, and the beamsplitter can direct the Terahertz (THz) waveform pulses towards at least one of the outer surface of the pipe or the inner surface of the pipe. In some embodiments, the processing device can be configured to detect a transmitted amplitude of the Terahertz (THz) waveform pulses transmitted from the transmitter and a received amplitude the reflected Terahertz (THz) waveform pulses received by the receiver, and detect a difference between the transmitted amplitude and the received amplitude, such difference indicative of a detected surface defect in the pipe.

The transmitter can be oriented to transmit the Terahertz (THz) waveform pulses substantially perpendicularly relative to the outer surface of the pipe or the inner surface of the pipe, and the receiver can be oriented to receive the reflected Terahertz (THz) waveform pulses substantially perpendicularly relative to the outer surface of the pipe or the inner surface of the pipe. The system can include a rotatable platform for rotating the pipe about a central longitudinal axis of the pipe. The rotatable platform can be mechanically rotated to detect surface defects in different surface areas of the pipe.

In some embodiments, the system can include a first rotatable polarizing filter disposed adjacent to or associated with the transmitter, and a second rotatable polarizing filter disposed adjacent to or associated with the receiver. In such embodiments, the Terahertz (THz) waveform pulses can be transmitted from the transmitter through the first rotatable polarizing filter, and the reflected Terahertz (THz) waveform pulses pass through the second rotatable polarizing filter prior to passage to the receiver. In such embodiments, the processing device can be configured to receive as input a parallel polarization measurement from the receiver with the second rotatable polarizing filter disposed in a parallel orientation relative to a central longitudinal axis of the pipe, and the processing device can be configured to receive as input a perpendicular polarization measurement from the receiver with the second rotatable polarizing filter disposed in a perpendicular orientation relative to the central longitudinal axis of the pipe.

The parallel polarization measurement being equal to the perpendicular polarization measurement is indicative of no intrinsic stress in the pipe. The parallel polarization measurement being different from the perpendicular polarization measurement is indicative of intrinsic stress in the pipe. The processing device can be configured to generate a stress map of the pipe to visualize birefringence changes based on the parallel polarization measurement and the perpendicular polarization measurement.

In some embodiments, the transmitter can be oriented to transmit the Terahertz (THz) waveform pulses towards a butt weld joint on the outer surface of the pipe or the inner surface of the pipe. In such embodiments, the transmitter can be oriented to transmit the Terahertz (THz) waveform pulses at a non-perpendicular angle relative to the outer surface of the pipe or the inner surface of the pipe, and the receiver can be oriented to receive the reflected Terahertz (THz) waveform pulses at a non-perpendicular angle relative to the outer surface of the pipe or the inner surface of the pipe.

The system can include a first prism and a second prism disposed on the outer surface of the pipe on opposing sides of the butt weld joint, at least one of the first prism or the second prism directing the transmitted Terahertz (THz) waveform pulses through the butt weld joint. The system can include a matching refractive index substance (e.g., petroleum jelly, VASELINE®, or the like) disposed between at least one of the first prism or the second prism and the outer surface of the pipe to eliminate or reduce air gaps between the first or second prism and the pipe. The system can include a metal inset disposed along one or more surfaces of the first prism or the second prism, the metal inset isolating and reducing back reflection of the transmitted Terahertz (THz) waveform pulses. The processing device can be configured to receive as input a transmitted amplitude of the Terahertz (THz) waveform pulses transmitted from the transmitter and a received amplitude the reflected Terahertz (THz) waveform pulses received by the receiver, and detect a difference between the transmitted amplitude and the received amplitude, such difference indicative of a detected defect in the butt weld joint of the pipe.

In accordance with embodiments of the present disclosure, an exemplary method of detecting pipe defects is provided. The method includes transmitting Terahertz (THz) waveform pulses with a transmitter towards at least one of an outer surface of a pipe or an inner surface of the pipe. The method includes receiving reflected Terahertz (THz) waveform pulses with a receiver from at least one of the outer surface of the pipe or the inner surface of the pipe. The method includes receiving as input at a processing device the Terahertz (THz) waveform pulses transmitted from the transmitter and the reflected Terahertz (THz) waveform pulses received by the receiver. Based on the received input, the method includes determining with the processing device if a defect in the pipe exists.

In some embodiments, the method can include detecting a transmitted amplitude of the Terahertz (THz) waveform pulses transmitted from the transmitter and a received amplitude the reflected Terahertz (THz) waveform pulses received by the receiver, and detecting a difference between the transmitted amplitude and the received amplitude. Such difference can be indicative of a detected surface defect in the pipe.

In some embodiments, the method can include receiving as input at the processing device a parallel polarization measurement from the receiver with a rotatable polarizing filter disposed in a parallel orientation relative to a central longitudinal axis of the pipe, and receiving as input at the processing device a perpendicular polarization measurement from the receiver with the rotatable polarizing filter disposed in a perpendicular orientation relative to the central longitudinal axis of the pipe. The parallel polarization measurement being equal to the perpendicular polarization measurement is indicative of no intrinsic stress in the pipe. The parallel polarization measurement being different from the perpendicular polarization measurement is indicative of intrinsic stress in the pipe.

In some embodiments, the method can include transmitting the Terahertz (THz) waveform pulses with the transmitter towards a butt weld joint on the outer surface of the pipe or the inner surface of the pipe, receiving as input a transmitted amplitude of the Terahertz (THz) waveform pulses transmitted from the transmitter and a received amplitude the reflected Terahertz (THz) waveform pulses received by the receiver, and detecting a difference between the transmitted amplitude and the received amplitude. Such difference can be indicative of a detected defect in the butt weld joint of the pipe.

In accordance with embodiments of the present disclosure, an exemplary non-transitory computer-readable medium storing instructions for detecting pipe defects is provided. Execution of the instructions by the processing device causes the processing device to transmit Terahertz (THz) waveform pulses with a transmitter towards at least one of an outer surface of a pipe or an inner surface of the pipe. Execution of the instructions by the processing device causes the processing device to receive reflected Terahertz (THz) waveform pulses with a receiver from at least one of the outer surface of the pipe or the inner surface of the pipe. Execution of the instructions by the processing device causes the processing device to receive as input at the processing device the Terahertz (THz) waveform pulses transmitted from the transmitter and the reflected Terahertz (THz) waveform pulses received by the receiver. Based on the received input, execution of the instructions by the processing device causes the processing device to determine with the processing device if a defect in the pipe exists.

Any combination and/or permutation of embodiments is envisioned. Other objects and features will become apparent from the following detailed description considered in conjunction with the accompanying drawings. It is to be understood, however, that the drawings are designed as an illustration only and not as a definition of the limits of the present disclosure.

BRIEF DESCRIPTION OF THE DRAWINGS

To assist those of skill in the art in making and using the systems and methods of detecting pipe defects, reference is made to the accompanying figures, wherein.

DETAILED DESCRIPTION

Exemplary systems discussed herein provide non-destructive evaluation for detection of defects in PE pipes and, particularly, defects in butt weld fusion joints in PE piping. The Terahertz (THz) imaging used by the systems can be used to analyze the piping in a variety of ways. In some embodiments, the systems can be used to detect external pipe defects. In some embodiments, the systems can be used to look through pipe joints and detect defects within the weld. In some embodiments, the systems can be used to analyze the outer and/or inner surfaces of the pipe and/or weld to detect defects within the weld. A high angle of incidence for the transmitter and receiver is used in such instances to detect defects within the weld. Detection of defects within the weld in this manner can be performed with or without a unique index matching prism configuration and/or with or without index matching gel (such as Vaseline®). In some embodiments, the systems can be used to capture photoelastic measurements that can image stresses that occur during the butt weld fusion process. Each of the embodiments is discussed in greater detail below.

Figure 1:
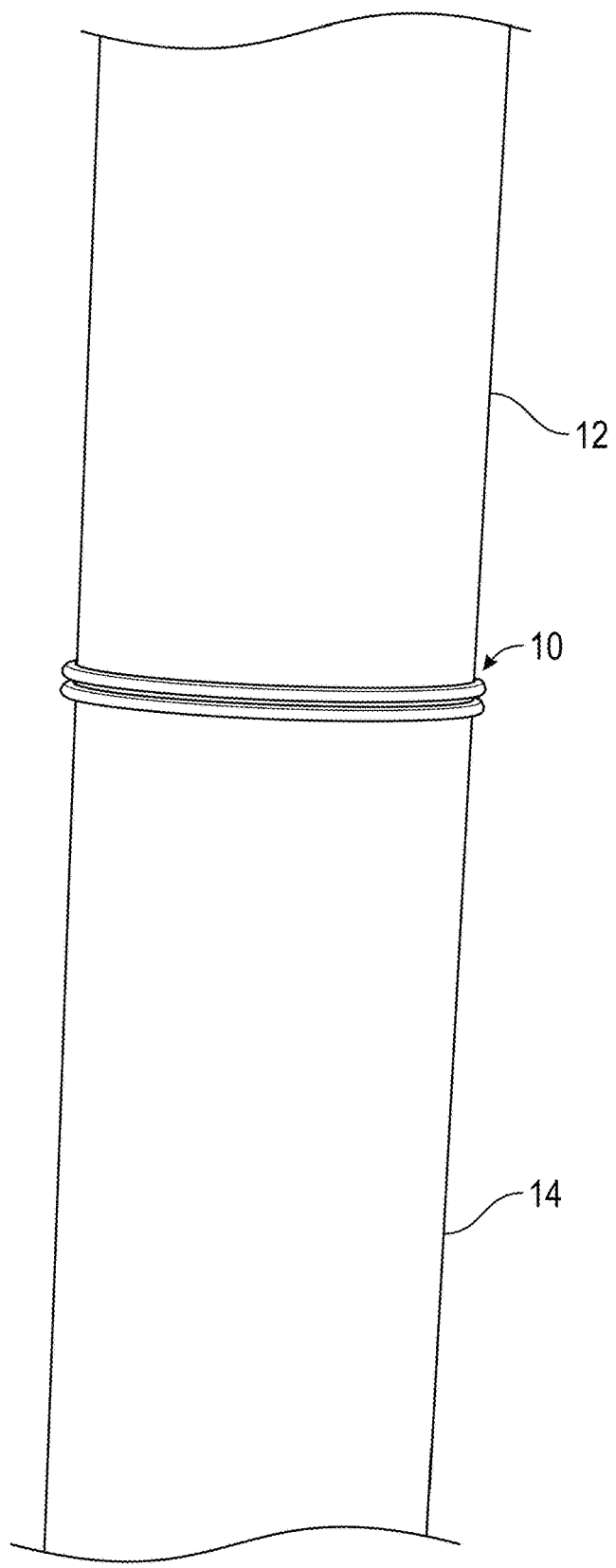
FIG. 1 is a traditional pipe joint including a curved bevel between respective pipe sections.
Figure 2:
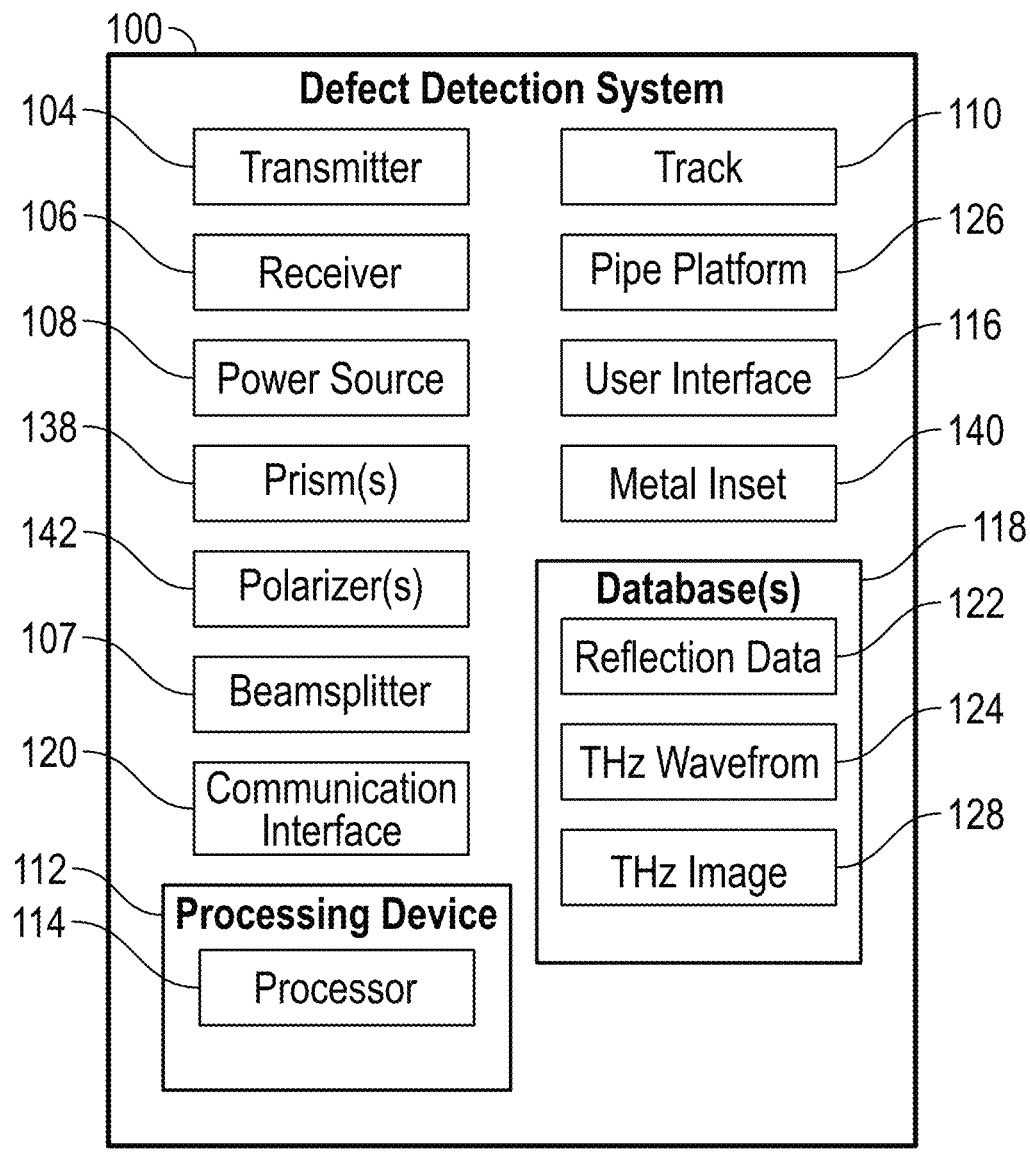
FIG. 2 is a diagrammatic view of an exemplary system for detecting pipe defects.

With reference to FIGS. 2 and 3, an exemplary system 100 for detecting external pipe defects (hereinafter "system 100"), and a partial view of a pipe 102 evaluated by the system 100. The system 100 includes a transmitter 104 and a receiver 106 coupled to a power source 108. The system 100 includes a track 110 along which the transmitter 104 and receiver 106 can simultaneously be moved in a vertical direction along the y-axis. The system 100 includes a processing device 112 with one or more processors 114 for operating the transmitter 104 and receiver 106. The system 100 can include a user interface 116 (e.g., a graphical user interface) for receiving input and/or providing visual output to a user of the system 100. The system 100 can include one or more databases 118 for electronically storing data relating to defect detection (e.g., reflection data 122, THz waveform data 124, or the like). The system 100 can include a communication interface 120 configured to provide communication between two or more components of the system 100. The system 100 can include one or more prisms 138 to support the transmitter 104 beam. The system 100 can include a metal inset 140 between the prisms 138. The system 100 can include two or more rotatable polarizers 142. The system 100 can include one or more beamsplitters 107.

Figure 3A:
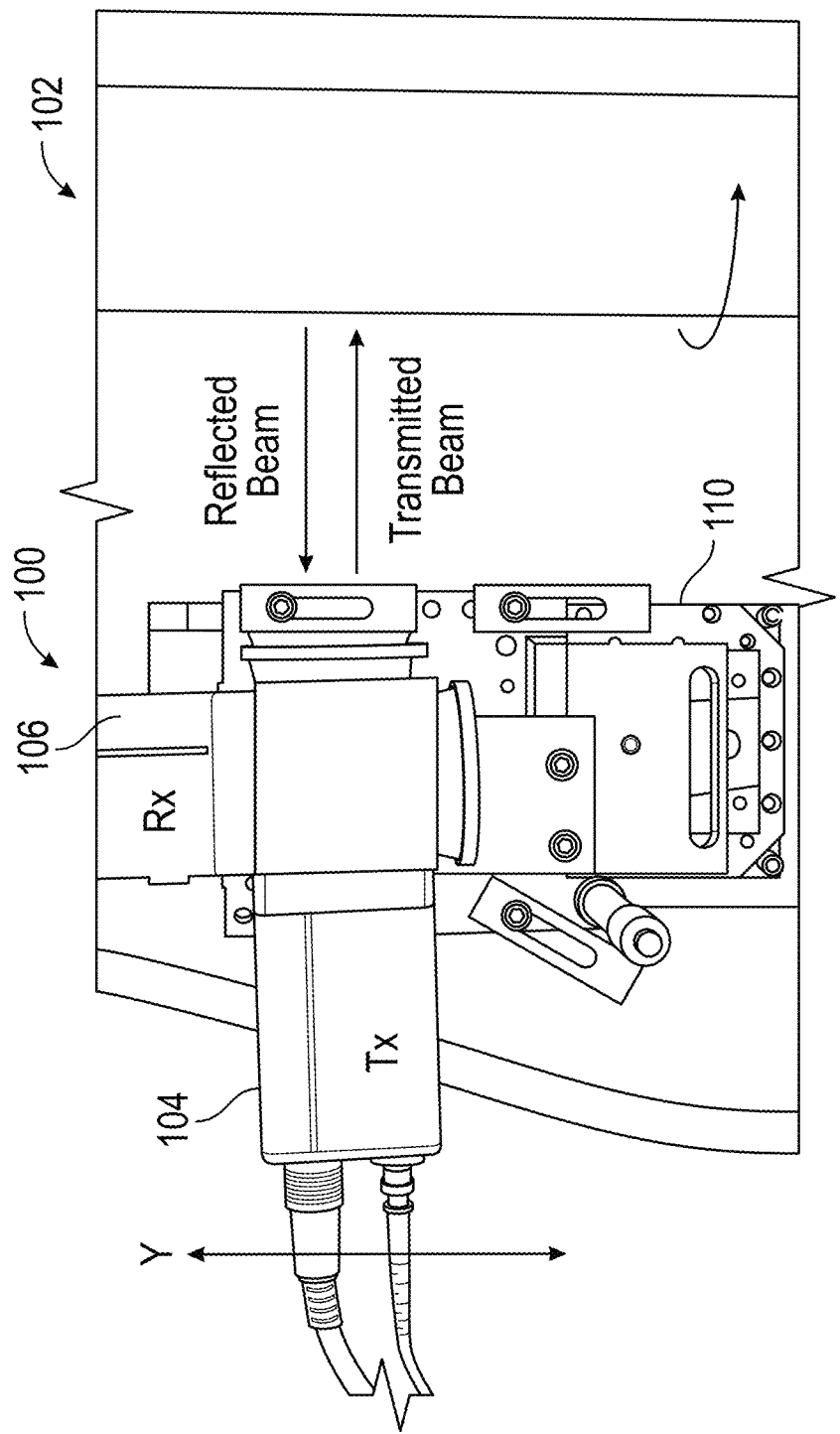
FIG. 3A is a side view of an exemplary system for detecting external pipe defects.

The system 100 of FIG. 3A is configured to detect external defects in pipe 102 walls with THz imaging. The THz transmitter 104 and receiver 106 can be oriented for direct reflection (e.g., perpendicular or substantially perpendicular) from the pipe 102, as shown in FIG. 3A. Reflection data 122 can be acquired by the receiver 106 on a pixel-by-pixel basis. At each pixel position, a time-domain THz waveform can be recorded which includes both the reflected pulse from the outer surface of the pipe 102 as well as the reflected pulse from the inner surface of the pipe 102. The pipe 102 can be mounted on a computerized rotation stage or platform 126, with the central vertical axis of the pipe 102 concentric with a rotation axis of the platform 126. For each angular position of the pipe 102, the system 100 can operate the THz transmitter/receiver unit to scan along the length of the pipe 102 in the y-direction. The THz waveform data is converted by the processing device 112 to THz images 128 using three analysis methods.

For a first analysis method, in the time-domain, the amplitude of the pulse (as measured by the maximum minus minimum value of the pulse) from the outer surface reflection is recorded. For a second analysis method, in the time-domain, the arrive time of the peak of the pulse from the outer surface is recorded. For a third analysis method, analysis in the frequency domain consisting of Fourier transforming the time-domain data is recorded. The magnitude of the Fourier transform is proportional to the square root of the power detected. By calculating the magnitude of the Fourier transform versus the frequency, and integrating the magnitude in a frequency band, an image of the THz power within a specified frequency band can be generated and recorded by the system 100. Using this acquired data, the system 100 can detect surface defects on the pipe 102.

Figure 3B:
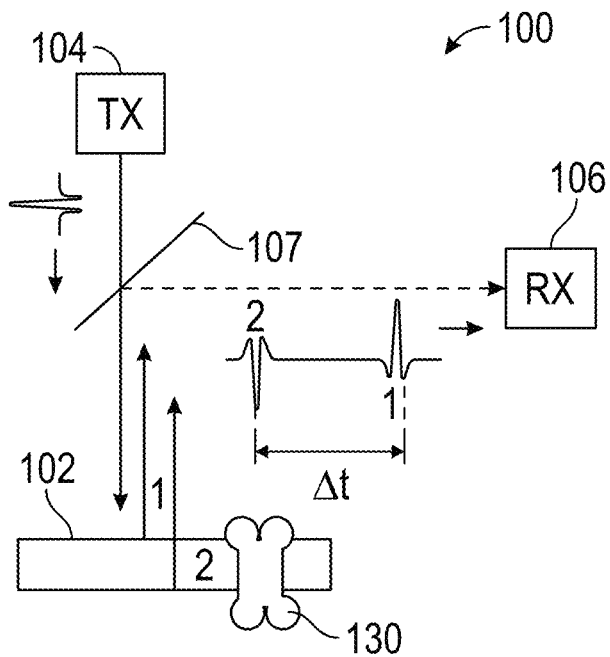
FIG. 3B is a diagrammatic view of an exemplary system for detecting surface pipe defects.
Figure 3C:
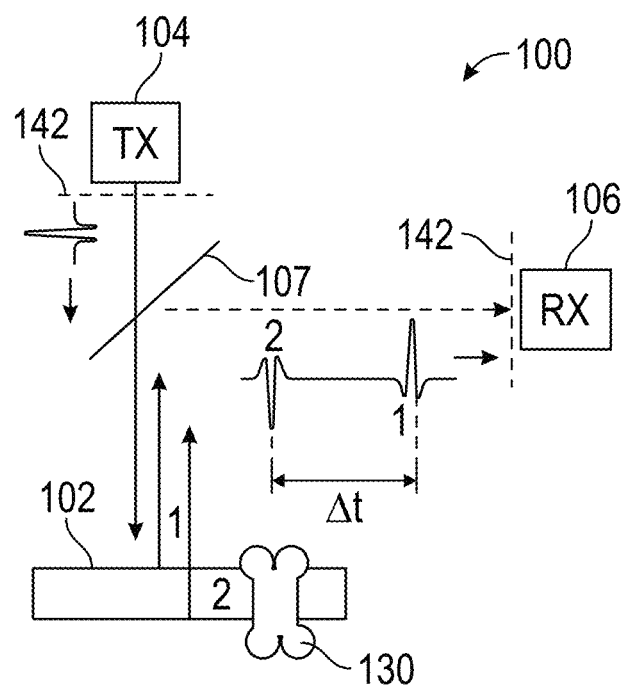
FIG. 3C is a diagrammatic view of an exemplary system for detecting stress in pipes near butt fusion joints.

FIG. 3B is a diagrammatic view of an exemplary system 100 for detecting surface pipe 102 defects, and FIG. 3C is a diagrammatic view of an exemplary system 100 for detecting stress in pipes 102 near butt fusion joints. The system 100 measures the amplitude of the pulses, and can be used to measure surface defects of the pipe 102, such as cuts, scratches, and/or gouges. The configuration of FIG. 3C can be used for measuring stress in a pipe 102 near the butt fusion joint 130. Rotatable polarizing filters 142 can be used in this configuration. The configuration of FIG. 3C can be used to measure the intrinsic stress near the pipe 102 joint weld. In the configurations of FIGS. 3B and 3C, the THz radiation does not pass through the butt weld joint 130. Since the THz radiation does not pass through the butt fusion joint 130, no information about defects at the interface of the two pipes 102 in the joint 130 is extracted.

Figure 4A:
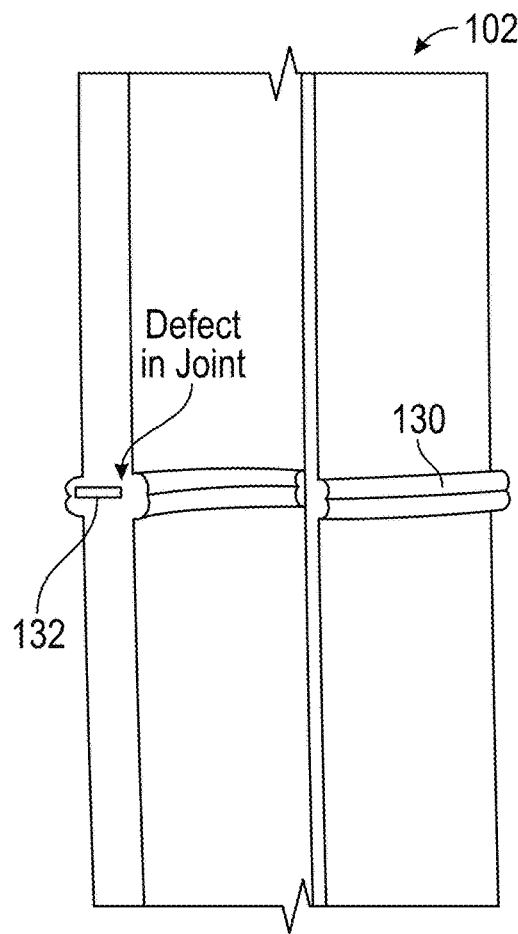
FIG. 4A is a cross-sectional view of a butt weld fusion joint including a defect.
Figure 4B:
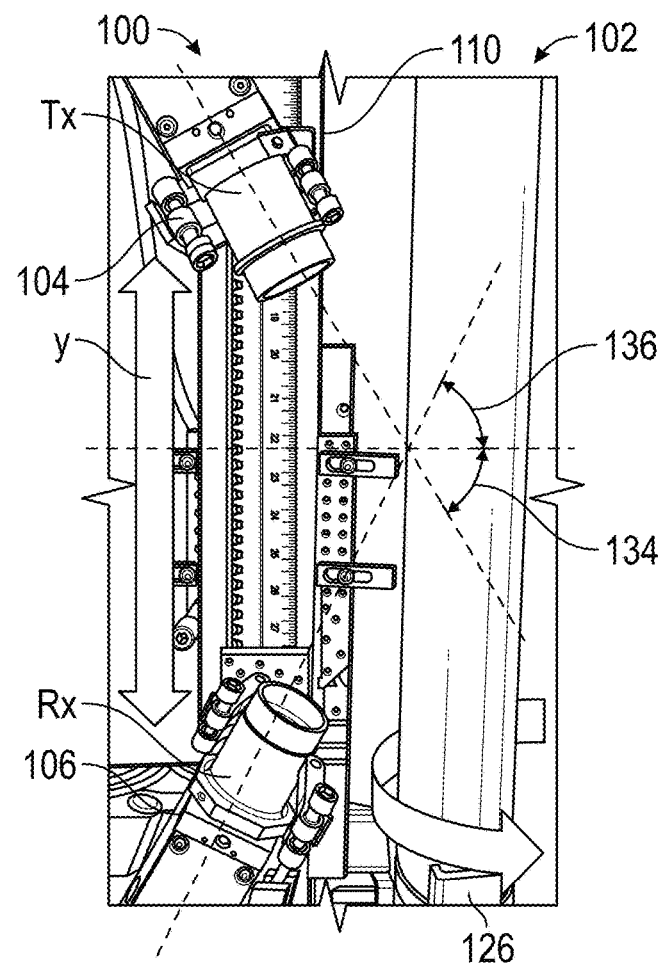
FIG. 4B is a side view of an exemplary system for detecting defects in a pipe joint.

FIG. 4A shows a cross-sectional view of a butt weld fusion joint 130 in a pipe 102 with a defect 132, and FIG. 4B shows the system 100 configured for detection and imaging of defects within the fusion joint 130. The system 100 is capable of detecting a variety of defects in the fusion joint 130, including the presence of air gaps, sand, oil, metal, combinations thereof, or the like. For detecting defects in the fusion joint 130, the system 100 can be reconfigured such that the transmitter 104 and receiver 106 have high angles 134, 136 of incidence for propagating the THz beam into the joint region. Traditional systems generally use a collinear transmitter/receiver alignment for transmission scans, and a perpendicular transmitter/receiver geometry (e.g., no angle if a beam splitter is used or a small angle if no beam splitter is used) for scans performed in reflection. The system 100 can use a plurality of angles 134, 136 for the transmitter 104/receiver 106 set-up, and can be dependent upon, e.g., pipe 102 thickness, the size of the bevel structure, the index of refraction of the pipe 102, combinations thereof, or the like. An index matching prism configuration for the transmitter 104 and receiver 106 enables a larger volume to be sampled in the butt fusion joint region by eliminating the strong refraction or bending of light as the light enters the plastic pipe 102. The large angles 134, 136 of incidence enable the THz radiation to pass through most of the butt fusion weld region and avoid the surface bevel. In some embodiments, the system 100 can operate without the prism configuration. However, in such embodiments, the system 100 may obtain a more limited sample volume in the butt fusion region. The configuration of FIG. 4B can be applied to both transmission and reflection geometries.

Figure 5A:
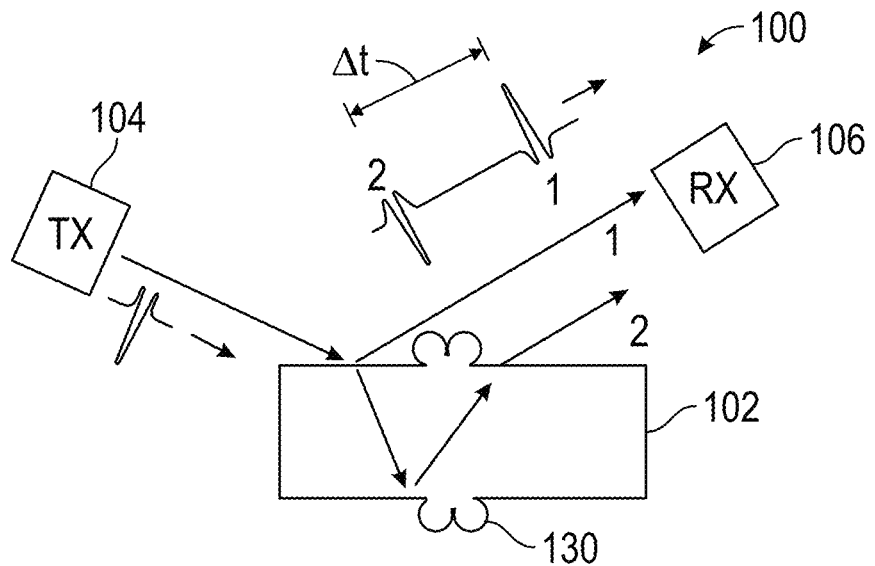
FIG. 5A is a diagrammatic view of beam propagation for a non-prism configuration.
Figure 5B:
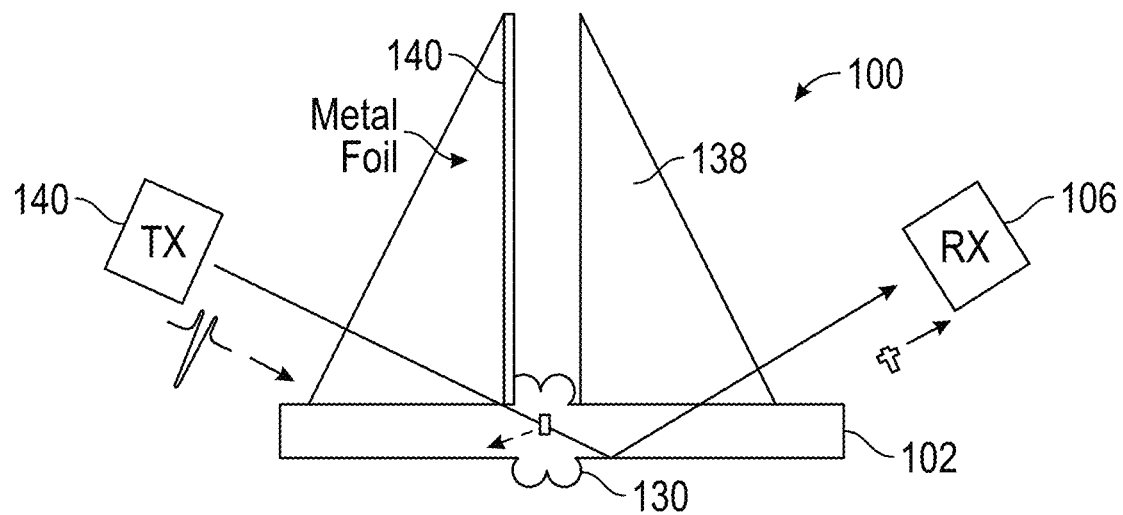
FIG. 5B is a diagrammatic view of beam propagation for a prism configuration.

FIG. 5A shows a diagrammatic view of beam propagation by the system 100 for a non-prism configuration, and FIG. 5B shows a diagrammatic view of beam propagation by the system 100 for a prism configuration. As shown in FIG. 5A, the reflection geometry can be used to detect defects within the butt fusion joint. The refraction (bending of light) when the light passes from the air to the plastic of the pipe 102 changes the direction of the THz pulse in the PE pipe 102. Pulse 1 therefore reflects from the first surface while pulse 2 refracts within the PE pipe 102. The refracted pulse 2, having a longer path length, arrives at the detector sometime after pulse 1. Such refractive effect can be removed using the prism 138 configuration of FIG. 5B. In some embodiments, a metal inset 140 (e.g., metal foil) can be used on one inner surface of a prism 138.

The configuration of FIG. 5B can be used to measure defects at the interface of the butt fusion joint 130. The coupling prisms 130 can be used to direct the THz pulses through the joint 130. The THz beam passes through the butt fusion joint 130 using the coupling prisms 130. Information about defects at the interface of the two pipes 102 can be detected, measured and extracted. The configuration of FIG. 5B can be used to detect fatal flaws in the pipe joint 130, e.g., air gap holes, metal, oil, sand, or the like.

Figure 6:
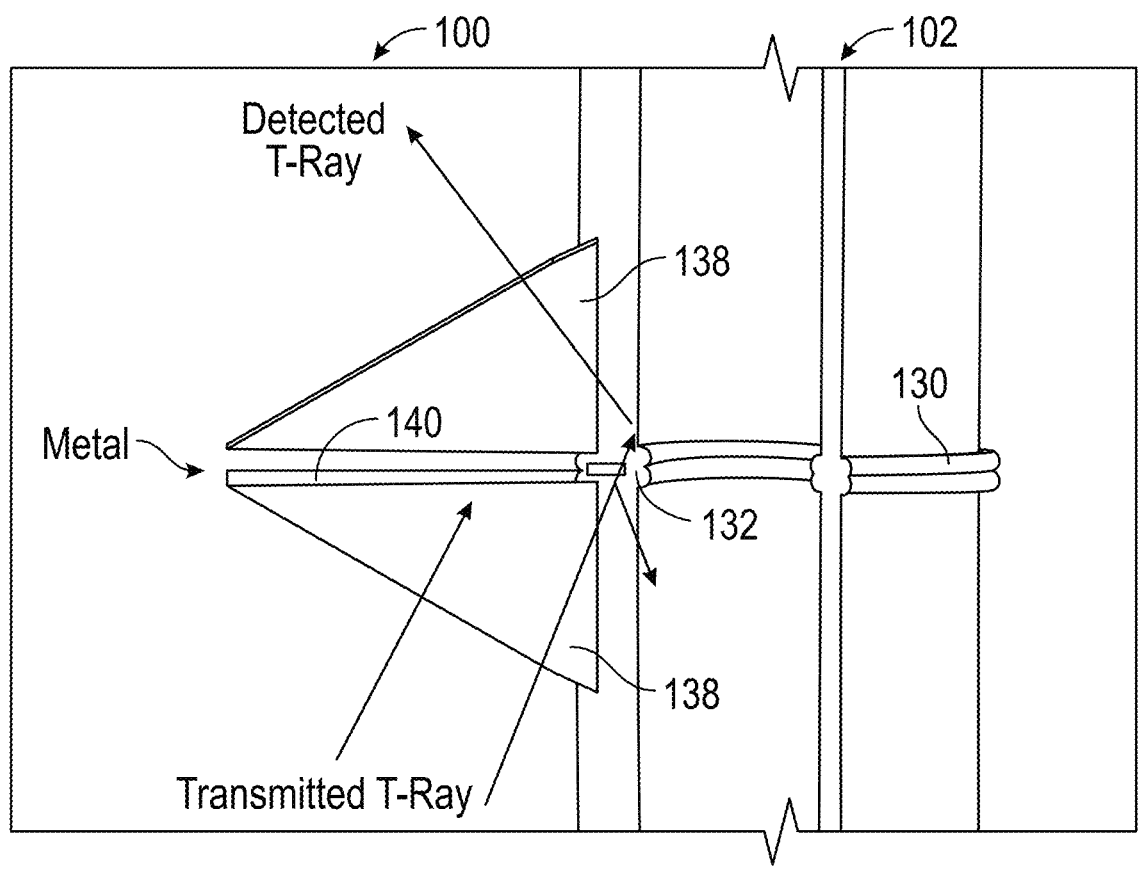
FIG. 6 is a side view of an exemplary system for detecting pipe defects including prisms.

FIG. 6 is a side view of an exemplary system 100 for detecting pipe defects including prisms 138 to couple the transmitted T-ray light from the transmitter 104 into the pipe 102 wall to minimize refractions. In some embodiments, the angle of the prisms 138 can be 30°-60°-90°. In some embodiments, the angle of the prisms 138 can vary. The fabricated polyethylene (PE) prisms 138 include a metal inset 140 shown in FIG. 6. The metal inset 140 extends between the prisms 138 up to the pipe 102 wall and isolates the back reflection needed for defect detection. The metal inset 140 can act as a barrier to eliminate or reduce spurious reflections of THz radiation. The defect scatters and attenuates the transmitted pulse, resulting in a smaller detected pulse amplitude at the receiver 106. Petroleum jelly (or a similar substance) can be used as a matching refractive index gel between the prism 138 and pipe 102 interface to eliminate or reduce air gaps. The PE prism 138 configuration can serve to couple a high angle of incidence of the THz beam into the PE pipe 102. The combination of a matching refractive index gel with the prisms 138 enables high angle of incidence transmission through the pipe 102 joint. In some embodiments, the prism 138 and high angle of incidence can reduce refraction and isolates the reflection from the inner pipe 102 wall. Using the configuration of FIG. 6, less power is transmitted through the joint region of the pipe 102.

Figure 7A:
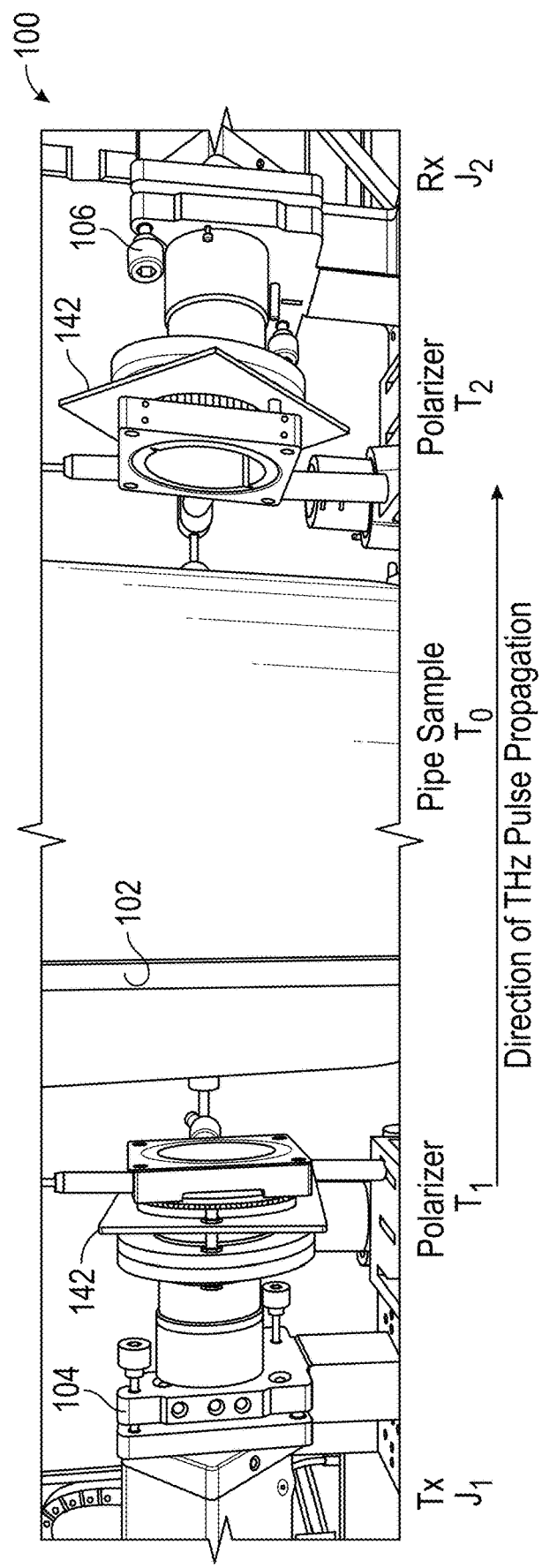
FIG. 7A is a side view of an exemplary system for detecting pipe defects using photoelastic measurements.

FIG. 7A is a side view of an exemplary system 100 for detecting pipe defects using photoelastic measurements. The system 100 of FIG. 7A can measure birefringence changes in the area surrounding butt fusion joints in the pipe 102 and images stresses that occur during the PE pipe 102 fusion process. Such measurement and imaging can be referred to herein as photoelastic measurements and yields stress maps within the pipe 102. The stress maps provide qualitative stress of plastic pipes 102 and fused plastic joints. To demonstrate the birefringence effect, a pair of polarizers 142 can be mounted near the transmitter 104 and receiver 106 of a terahertz spectrometer on opposing sides of the pipe 102, and pulse arrival time differences between vertical and horizontal polarization measurements can be made to reconstruct an image of stresses within the PE pipe 102. During experimentation of the configuration of FIG. 7A, the first scan was performed with the polarizer 142 for the transmitter 104 (T1) having vertical polarization. The second scan was changed such that the polarizer for the transmitter 104 (T1) was changed to horizontal polarization. The differences between the polarized THz pulse arrival times was used to image stress-induced birefringence.

Figure 7B:
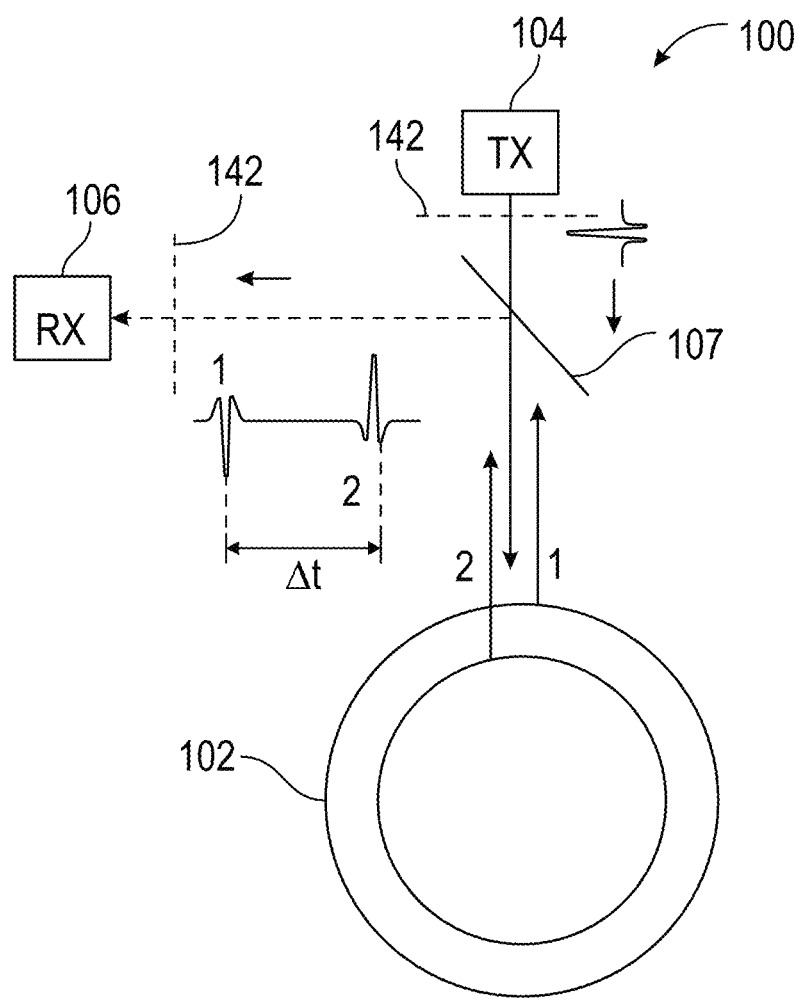
FIG. 7B is a diagrammatic view of the exemplary system including polarizers for the respective transmitter and receiver.

FIG. 7B is a diagrammatic view of the exemplary system 100 including rotatable polarizers 142 for the respective transmitter 104 and receiver 106. The THz transmitter 104 transmits a THz pulse through a beamsplitter 107. A portion of the THz pulse is reflected from the outer surface of the pipe 102 and also from the inner surface of the pipe 102. The two reflected pulses are directed by the beamsplitter 107 to a THz receiver 106 which measure the THz pulses. The time delay between the two pulses of THz radiation can be used to determine the thickness of the pipe wall. By spinning the detection apparatus of the system 100 around the pipe 102 and measuring the absolute timing of the two pulses, the system 100 can extract the diameter of the pipe 102, the thickness of the wall of the pipe 102, and the variations in the pipe 102 diameter (e.g., "ovalness" or eccentricity of the pipe 102 cross-section).

Measurements can be taken by the system 100 with the polarizers 142 measuring the THz electromagnetic radiation polarized parallel to the long axis of the pipe 102 (i.e., perpendicular to the page) and with the polarization perpendicular to the long axis of the pipe (i.e., in the plane of the page). Using this data from measurement, this system 100 is capable of determining the thickness, diameter and eccentricity of the pipe 102. In addition, by measuring the timing differences between the parallel and perpendicular polarization measurement, the system 100 can measure the intrinsic stress of the pipe 102 material through the photoelastic effect. If there is no intrinsic stress in the pipe, both parallel and perpendicular polarization measurements would give identical results and the timing differences between the parallel and perpendicular polarization measurements would be zero, indicating no intrinsic stress in the pipe 102. If there is intrinsic stress in the pipe 102, the parallel and perpendicular polarization measurements would be slightly different.

Variations in the generated stress maps can indicate and be representative of over pressured, under pressured, and "perfect" pressured pipes 102. In some embodiments, the system 100 of FIGS. 7A-7B can be used to identify pipes 102 with matching internal stresses before the butt weld fusion process is applied. For example, the phenomena of cold fusion joints may be related to the butt weld fusion of pipes 102 with mismatched internal stresses. The imaging provided by the system 100 is capable of distinguishing between pipes 102 with differing internal stresses to assist in selection of pipes 102 for butt weld fusion that have substantially matching internal stresses. Such imaging can identify residual stress of pipes 102 to be jointed in order to reduce the stress in pipe joints once such pipes 102 are joined. Pipe 102 sections to be joined can thereby be matched using the system 100 prior to butt fusion welding to minimize the resulting stress in the pipe 102 joint. The system 100 can therefore be used to perform non-destructive evaluation of butt weld fused pipes 102, and/or as part of quality control verification of internal stresses in cut samples of pipes 102 prior to fusion.

Figure 8A:
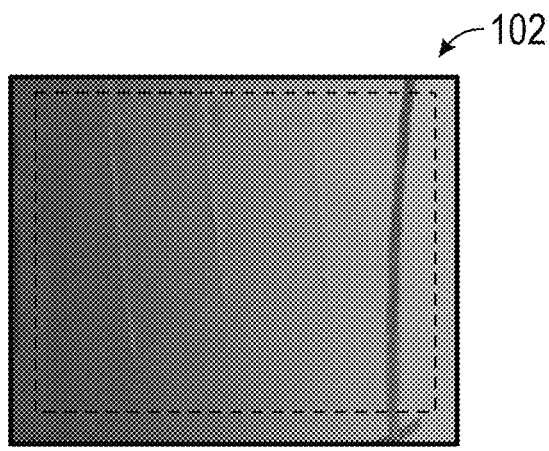
FIG. 8A shows an axial cut on a pipe exterior.
Figure 8B:
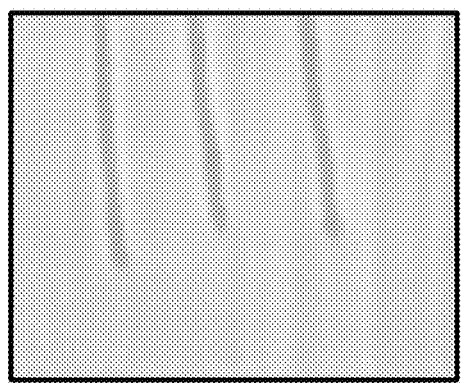
FIG. 8B is a THz image generated by amplitude of reflected pulse from the outer wall of the pipe.
Figure 8C:
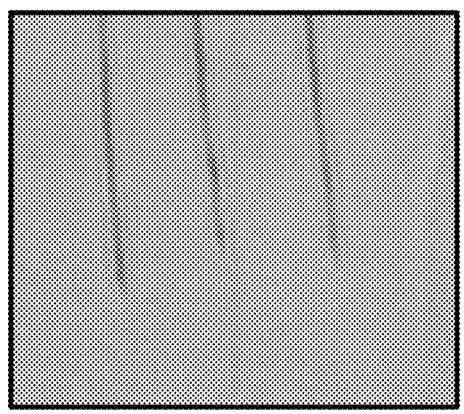
FIG. 8C is a THz image generated by reflected power in the 0.7-1.0 THz band, with a vertical step size of 200 microns and a step size in the rotational direction (horizontal axis) of 0.1 degrees.

Experimental data was collected on each of the three THz imaging methods using the system 100 (e.g., external surface defect detection, defect detection within the butt weld fusion joint, and photoelastic measurements and stress analysis). FIGS. 8A-8C and 9A-9C are related to experimental data for sharp cuts and scratches of a pipe. FIG. 8A shows an axial cut on a medium-density polyethylene (MDPE) pipe exterior, FIG. 8B is a THz image generated by amplitude of reflected pulse from the outer wall of the pipe, and FIG. 8C is a THz image generated by reflected power in the 0.7-1.0 THz band, with a vertical step size of 200 microns and a step size in the rotational direction (horizontal axis) of 0.1 degrees.

The THz image of FIG. 8B was generated using the amplitude of the detected THz pulse reflected from the front surface of the pipe. The THz image of FIG. 8C was generated by computing the detected reflected power in the 0.7-1.0 THz band. For the images of FIGS. 8B-8C, the THz beam was scanned in the vertical direction, approximately parallel to the direction of the axial cuts. The defects are visible in the THz range because the defects scatter THz power from the THz pulses, resulting in a reduction in pulse amplitude and power.

Figure 9A:
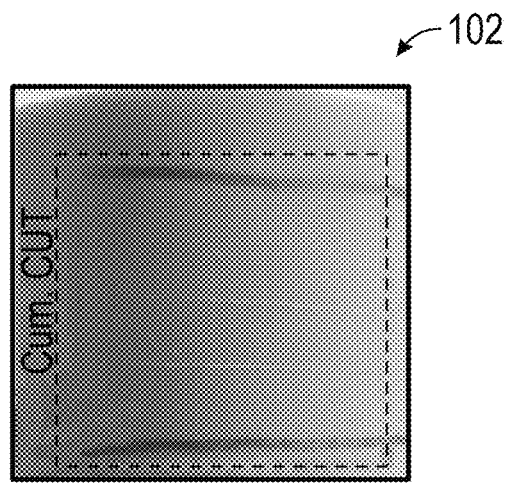
FIG. 9A is an image of a circumference cut on pipe exterior.
Figure 9B:
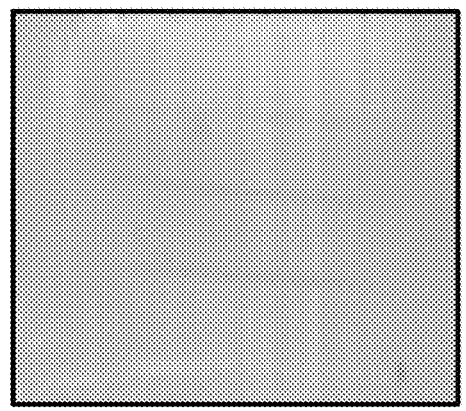
FIG. 9B is a THz image generated by an amplitude of a reflected pulse.
Figure 9C:
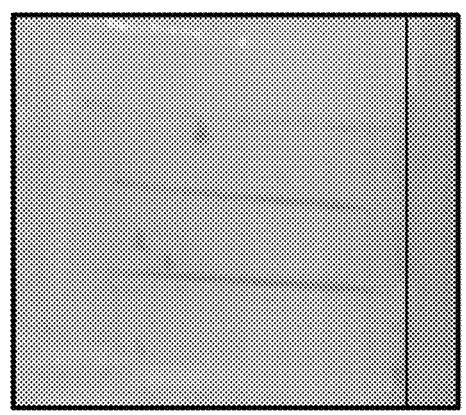
FIG. 9C is a THz image generated by transmitted power in the 0.4-1.0 THz band, with a vertical step size of 200 microns and a step size in the rotational direction (horizontal axis) of 0.1 degrees.

FIG. 9A is an image of a circumference cut on pipe exterior, FIG. 9B is a THz image generated by an amplitude of a reflected pulse, and FIG. 9C is a THz image generated by transmitted power in the 0.4-1.0 THz band, with a vertical step size of 200 microns and a step size in the rotational direction (horizontal axis) of 0.1 degrees. FIG. 9A shows the sharp cut scratches of the pipe for a circumference cut. The THz image of FIG. 9B was generated using the amplitude of the detected THz pulse reflected from the front surface of the pipe. The THz image of FIG. 9C was generated by computing the detected reflected power in the 0.7-1.0 THz band. The THz image in of FIG. 9C also shows evidence of a black marker line from FIG. 9A. In the THz image, the marker line appears as the yellow lines in (c). For the images of FIGS. 9B-9C, the THz beam was scanned in the vertical direction, approximately perpendicular to the direction of the cuts. While the presence of the cuts is still discernable in these images, the contrast was not as good as with the axial cuts of FIGS. 8A-8C.

Figure 10A:
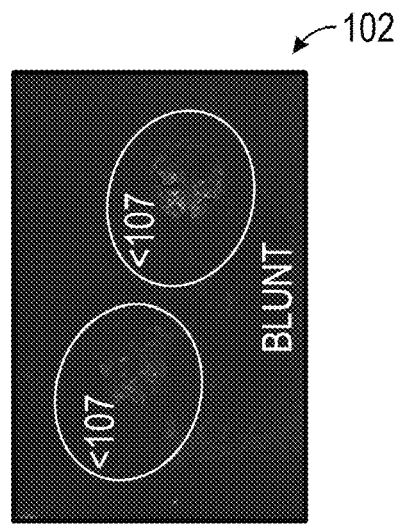
FIG. 10A is an image of a blunt gouge on a pipe exterior.
Figure 10B:
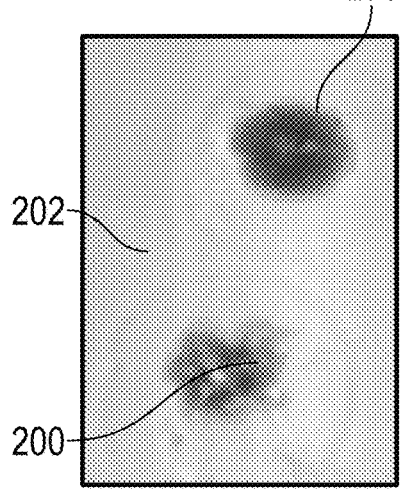
FIG. 10B is a THz image generated by amplitude of reflected pulse.
Figure 10C:
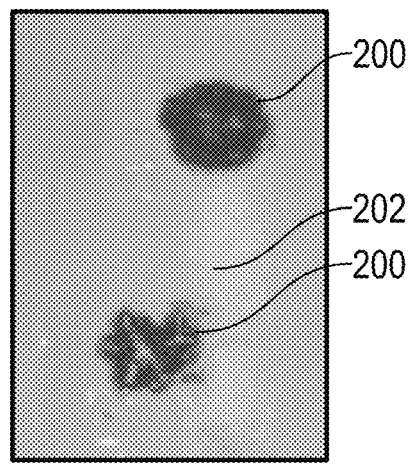
FIG. 10C is a THz image generated by transmitted power in the 0.4-2.0 THz band.

FIGS. 10A-10C are related to experimental data for blunt and gouge defects in a pipe. FIG. 10A is an image of a blunt gouge on a pipe exterior, FIG. 10B is a THz image generated by amplitude of reflected pulse, and FIG. 10C is a THz image generated by transmitted power in the 0.4-2.0 THz band. The blunt gauge defects were clearly evident in the THz range since the surface of the defects was no longer directly reflecting the THz power to the receiver. The local tilt of the surface directed the THz power slightly off the optimal detection direction resulting in a reduction in pulse amplitude and power. Blue colors 200 indicate lower THz pulse amplitude or power while yellow colors 202 indicate higher amplitude or power.

Figure 11A:
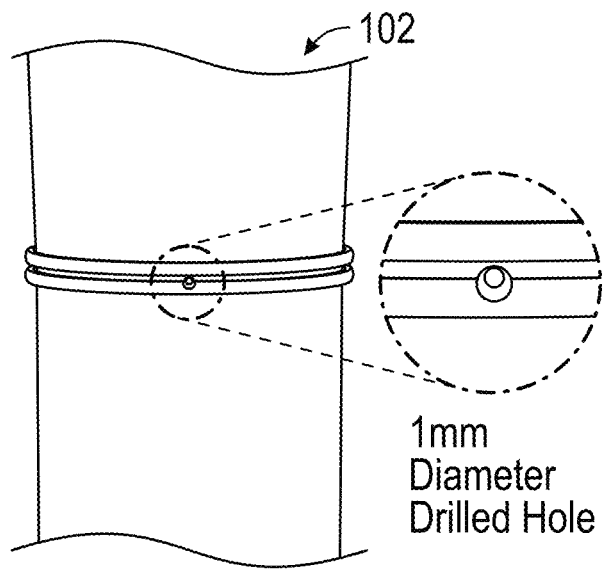
FIG. 11A shows a fabricated defect of a 1.0 mm diameter drilled into a pipe joint.
Figure 11B:
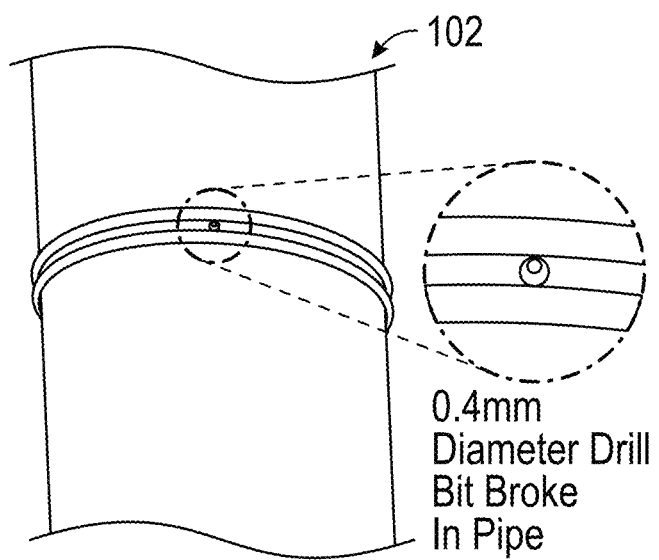
FIG. 11B shows a fabricated defect of a 0.4 mm diameter drilled into the pipe joint, with the 0.4 mm drill bit breaking approximately halfway into the pipe joint.
Figure 12:
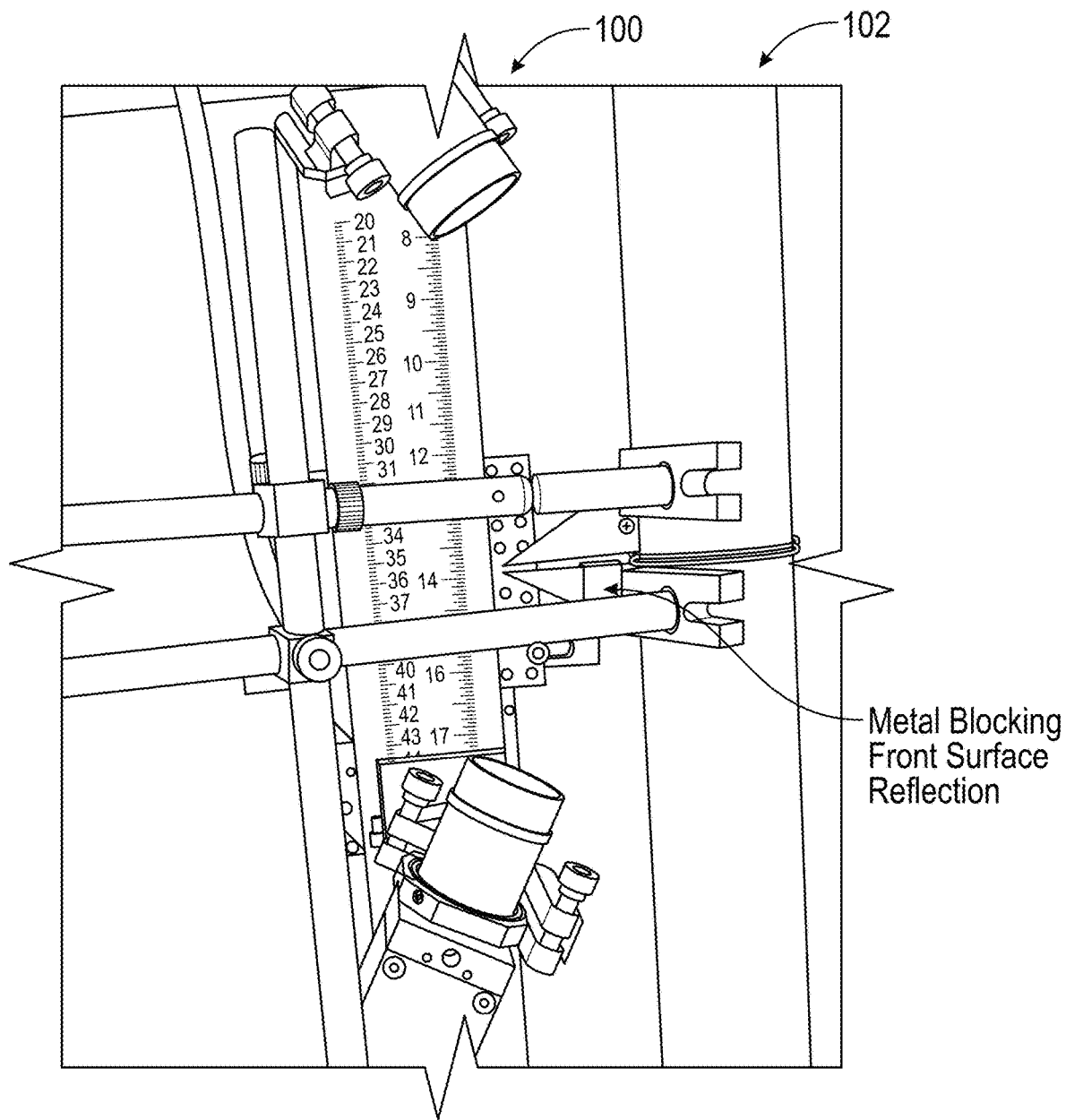
FIG. 12 shows a THz transmitter and receiver of an exemplary system mounted at high angles of incidence for testing of the fabricated defects in the pipe joint.
Figure 13A:
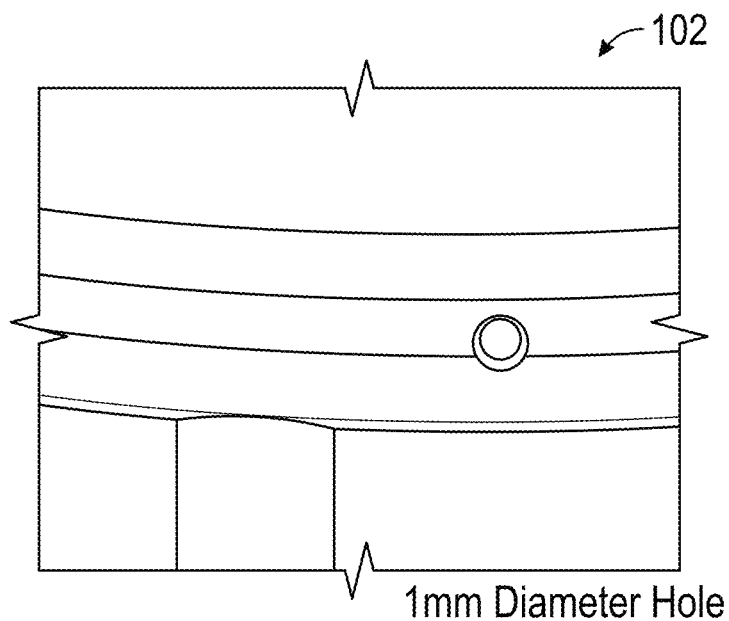
FIG. 13A shows a pipe joint with a fabricated defect in the form of a 1.0 mm diameter hole.
Figure 13B:
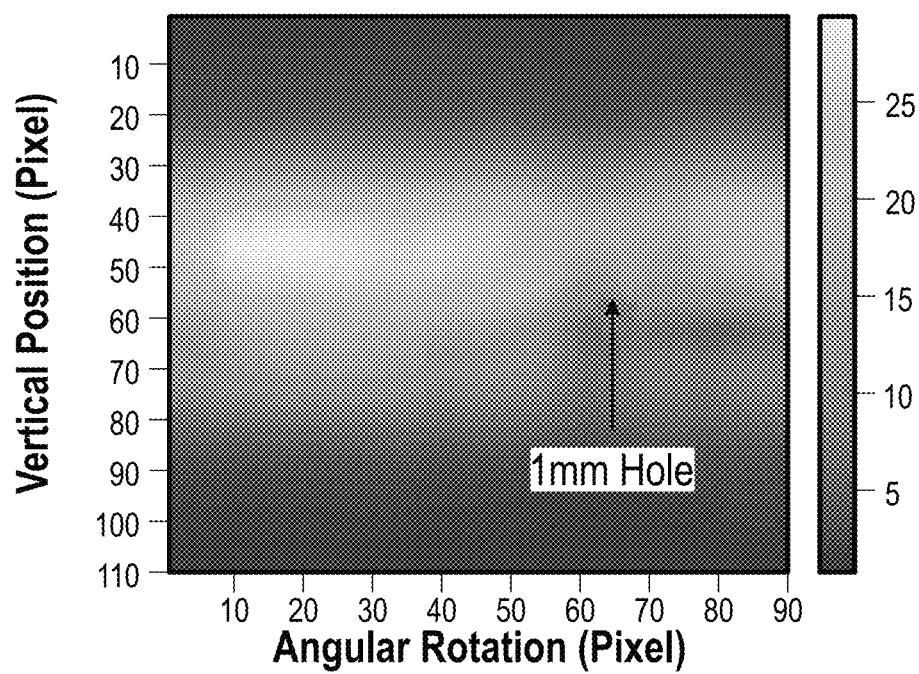
FIG. 13B is a THz image showing the area of the 1.0 mm diameter drilled defect within the bevel region as imaged in MATLAB by power integration of the time domain from 0.2 to 0.5 THz.
Figure 14A:
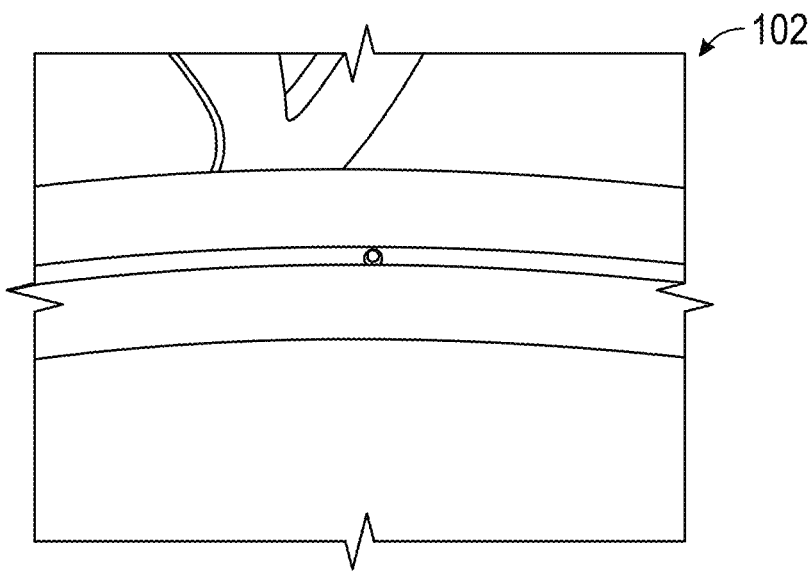
FIG. 14A shows a pipe joint with a fabricated defect in the form of a 0.4 mm diameter hole.
Figure 14B:
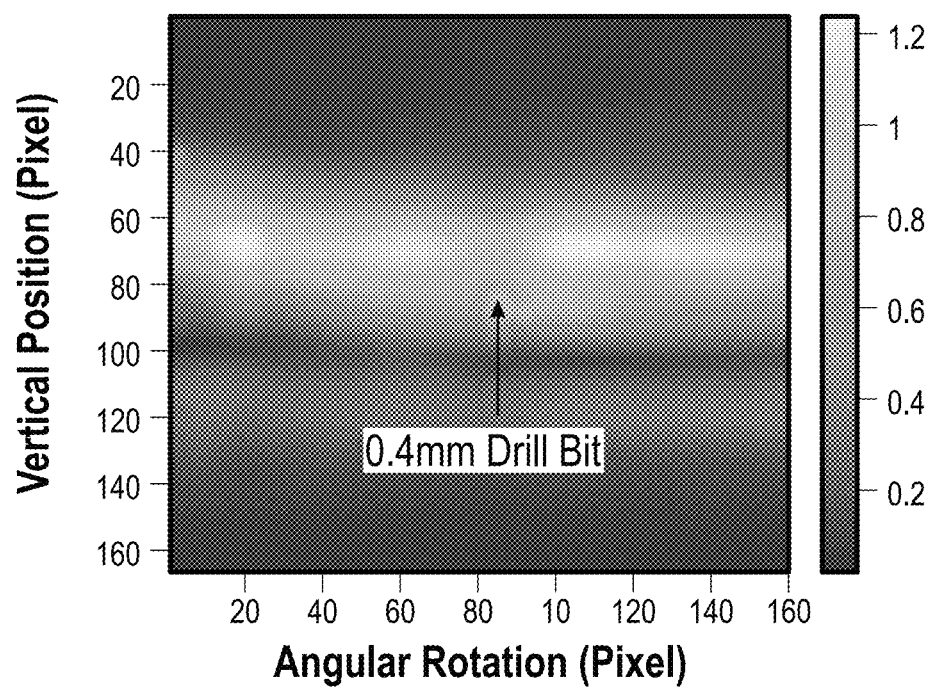
FIG. 14B is a THz image of the 0.4 mm diameter broken drill bit within the pipe bevel as imaged in MATLAB by power integration of the time domain from 0.5 to 0.6 THz.

FIGS. 11A-11B, 12, 13A-13B and 14A-14B are related to experimental data for defects in a pipe joint. In particular, FIG. 11A shows a fabricated defect of a 1.0 mm diameter drilled into a pipe joint, and FIG. 11B shows a fabricated defect of a 0.4 mm diameter drilled into the pipe joint, with the 0.4 mm drill bit breaking approximately halfway into the pipe joint. FIG. 12 shows a THz transmitter and receiver of an exemplary system mounted at high angles of incidence for testing of the fabricated defects in the pipe joint. FIG. 13A shows a pipe joint with a fabricated defect in the form of a 1.0 mm diameter hole, and FIG. 13B is a THz image showing the area of the 1.0 mm diameter drilled defect within the bevel region as imaged in MATLAB by power integration of the time domain from 0.2 to 0.5 THz. FIG. 14A shows a pipe joint with a fabricated defect in the form of a 0.4 mm diameter hole, and FIG. 14B is a THz image of the 0.4 mm diameter broken drill bit within the pipe bevel as imaged in MATLAB by power integration of the time domain from 0.5 to 0.6 THz.

The effectiveness of imaging pipe defects with the system 100 are demonstrated on a pipe sample containing fabricated microdrill bit holes. The hole defects had diameters of 1.0 mm and 0.4 mm. The pipe sample was placed on a rotation stage and the transmitter/receiver were mounted at a high angle of incidence of about 60 degrees from the pipes normal, with the prism configuration discussed above incorporated into the set-up. The transmitter and receiver were moved in tandem in the y-direction during the scanning process. The prism configuration coupled the THz radiation into the pipe and isolated the inner pipe wall reflection. A scan was performed in the y-direction and subsequently the pipe was rotated for a specified angle. The scanning process was repeated for the area of interest in the pipe. The results from this imaging are shown in FIGS. 13A-13B and 14A-14B. The images were generated by integrating the Fourier transform of the time domain for a select frequency band. FIG. 13B shows an image of the 1.0 mm hole defect by frequency power integration from 0.2 to 0.5 THz, and FIG. 14B shows an image of the 0.4 mm hole defect with frequency power integration from 0.5 to 0.6 THz.

Figure 15:
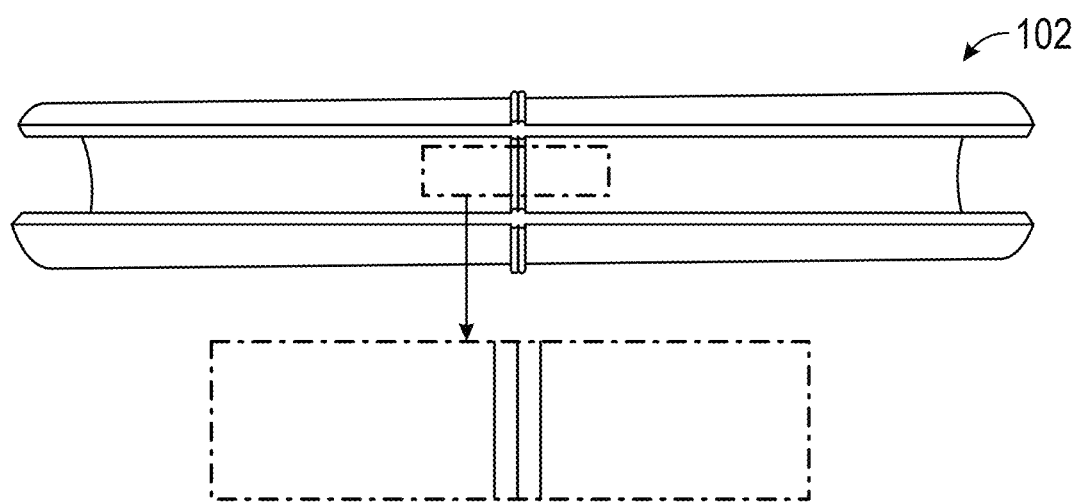
FIG. 15 shows an area surrounding a pipe joint analyzed for changes in birefringence using photoelastic measurements.

FIGS. 15-21D are related to experimental data for photoelastic measurements and stress analysis in pipes and/or pipe joints. For experimentation of the photoelastic measurements, a pair of polarizers was mounted near the transmitter and receiver of a THz spectrometer, and pulse arrival time differences between vertical and horizontal polarization measurements were made to reconstruct an image of stresses within the PE pipe. FIG. 15 shows an area of interest for a pipe sample with a perfect pressure joint that was measured by the system 100. An initial THz scan was performed with vertical polarization. A second THz scan was subsequently performed with horizontal polarization. Pulse arrival time differences between vertical and horizontal polarization measurements were taken at the detector.

Figure 16A:
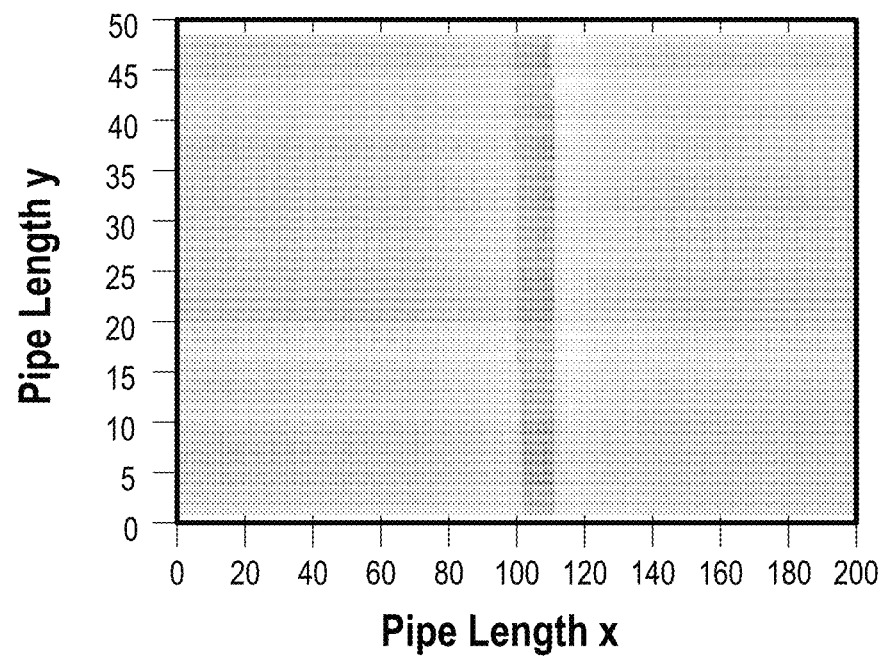
FIGS. 16A-16D show a three-dimensional mesh grid image of a pipe surrounding a bevel region generated in MATLAB, with FIG. 16A showing a vertical stripe between x=102 and x=110 representing the pipe bevel, FIGS. 16B and 16C showing a three-dimensional rotation of the image of FIG. 16A, and FIG. 16D showing an average in the y-direction.
Figure 16B:
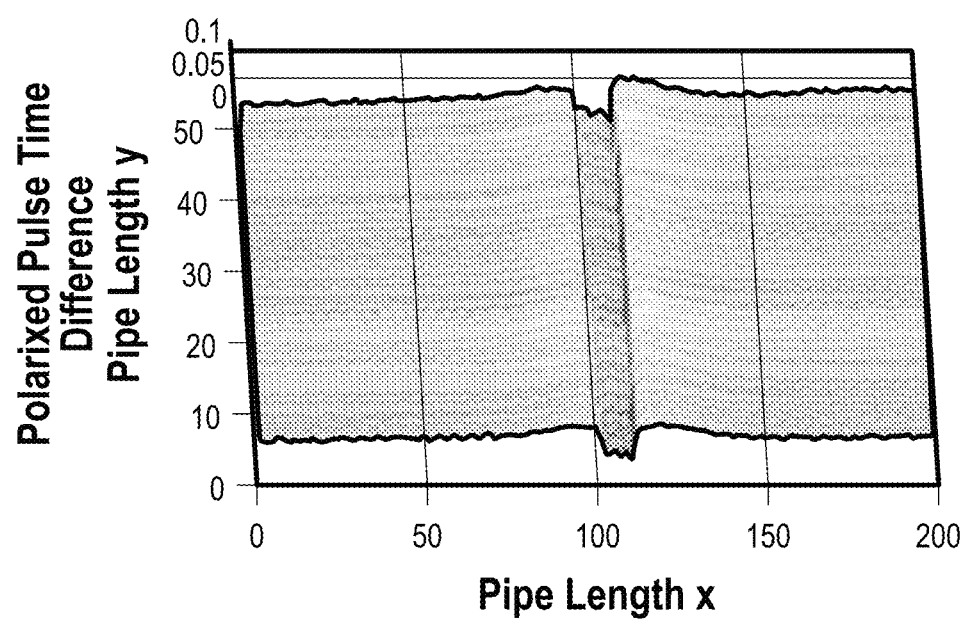
Figure 16C:
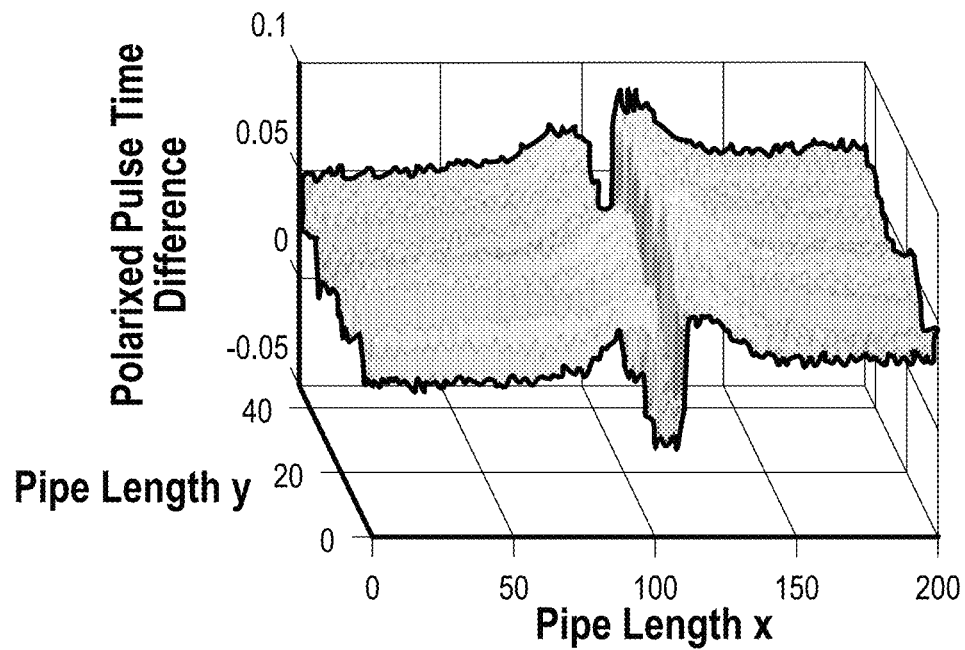
Figure 16D:
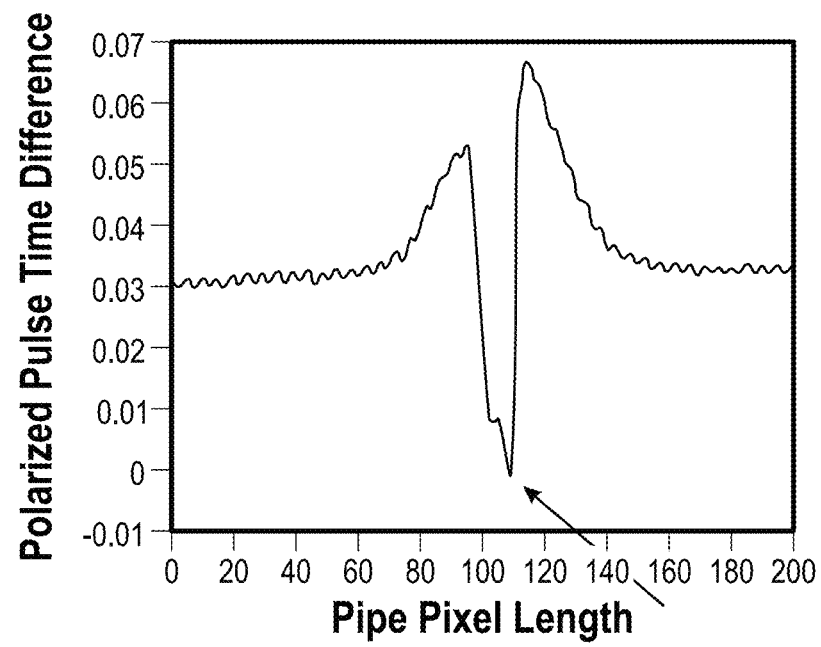

FIGS. 16A-16D show a three-dimensional mesh grid image of a pipe surrounding a bevel region generated in MATLAB, with FIG. 16A showing a vertical stripe between x=102 and x=110 representing the pipe bevel, FIGS. 16B and 16C showing a three-dimensional rotation of the image of FIG. 16A, and FIG. 16D showing an average in the y-direction. In particular, FIG. 16B shows the three-dimensional mesh grid image generated via MATLAB from the time difference measurements and represents changes in birefringence. To better understand the changes in birefringence that are occurring approaching the bevel, the polarized pulse time difference was averaged along the y-direction and plotted as shown in FIG. 16D.

The resulting plot for the tested perfect pressure joint shows an area of almost constant time difference that increased to a peak, and then decreased to a low value corresponding to the bevel location, followed by an increased peak that declined to a constant value. The two high peaks represent changes in birefringence due to stress from pipe fusion during the butt fusion welding process. The data of interest is located to the left and right of the bevel region corresponding to the region from the x=0 origin to the first high peak of the graph and from the second high peak and larger values of x. The low peak indicated by the arrow in FIG. 16D is attributed to random scattering effects off the pipe bevel and is therefore not considered relevant.

Figure 17:
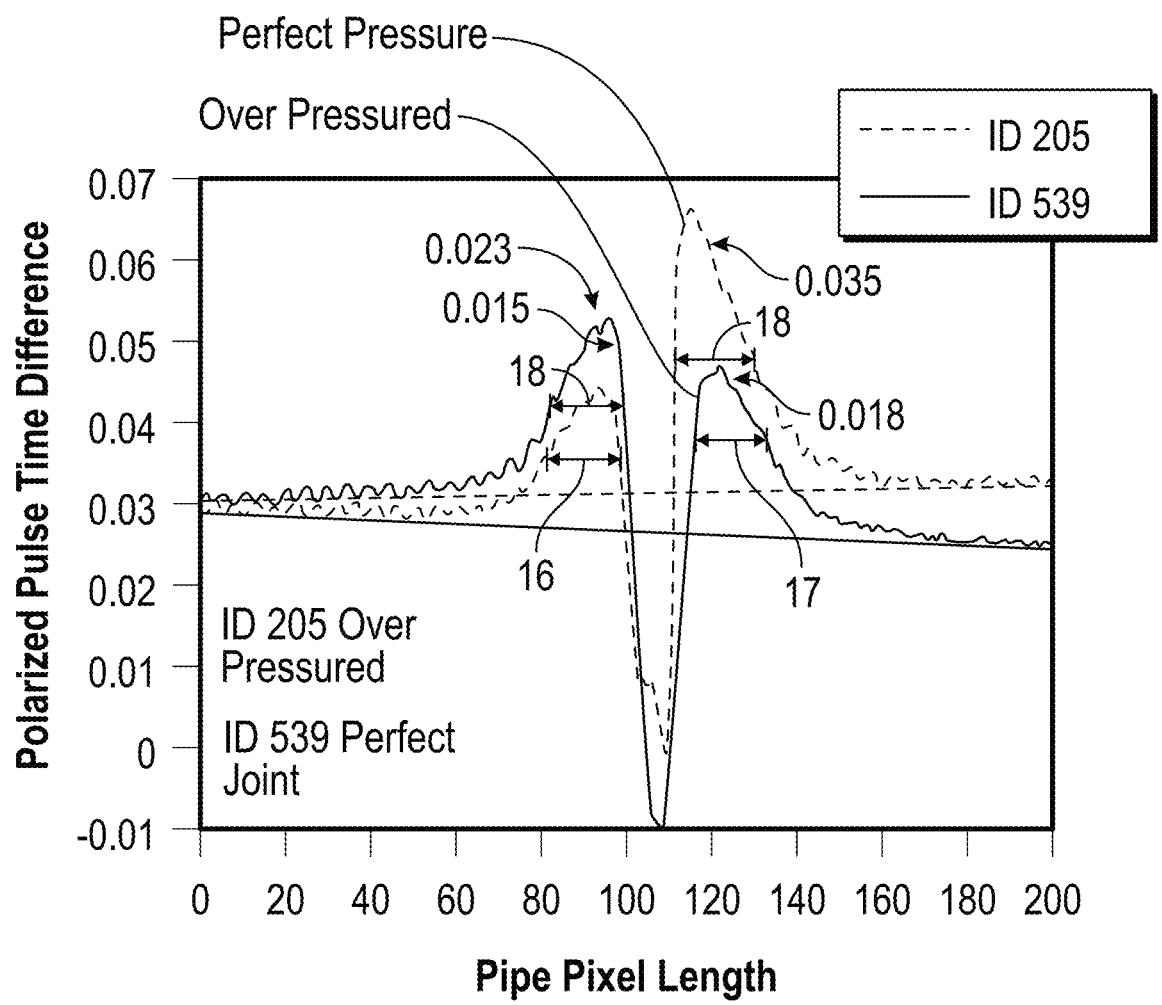
FIG. 17 is a diagram showing a comparison of time difference for polarized THz pulses for over pressured and perfect pressure pipe samples.

FIG. 17 is a diagram showing a comparison of time difference for polarized THz pulses for over pressured and perfect pressure pipe samples. The averaged graphs display similar shapes and trends. However, the perfect pressure pipe has higher and wider peaks when compared to the over pressured pipe joint. Therefore, a comparison of the peaks shows a measurable height and width difference. The perfect pressure pipe has peak heights of 0.023 and 0.035 as compared to peaks of 0.015 and 0.018 of the over pressured pipe. The perfect pressure had widths of 18 pixels for each peak, while the over pressured pipe had widths of 16 and 17 pixels per peak measured at full width of half maximum peak.

Figure 18A:
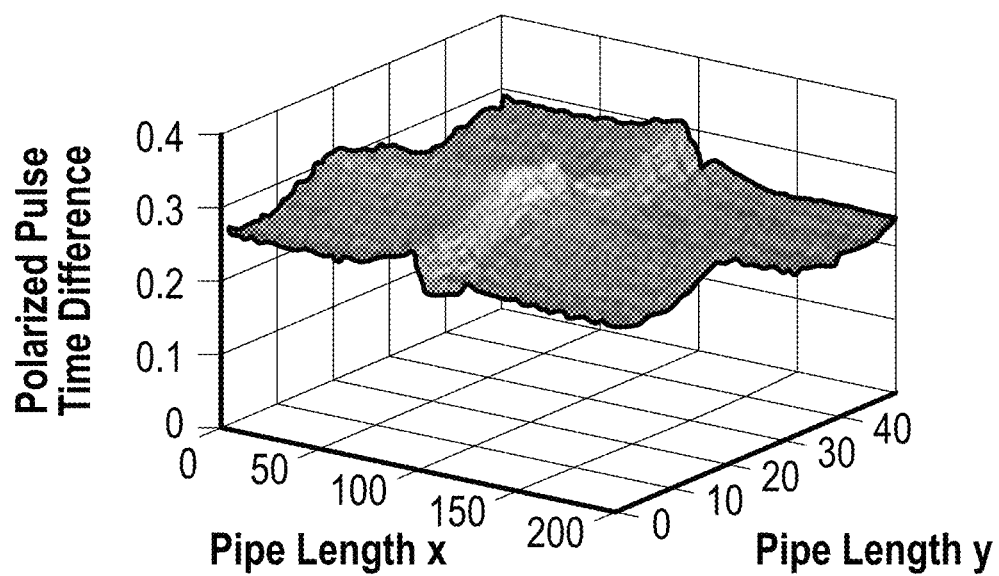
FIGS. 18A and 18B show diagrams of differing internal stresses for butt weld fused pipes.
Figure 18B:
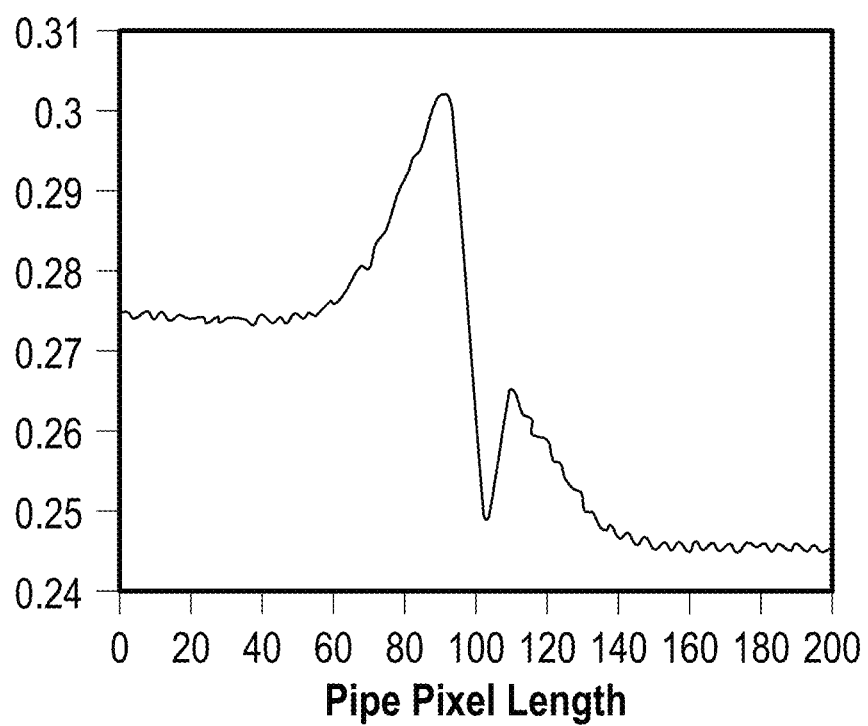

FIGS. 18A and 18B show diagrams of differing internal stresses for butt weld fused pipes. The left side of the graph shows a higher sharper peak. The right side of the graph shows a significantly lower peak, and an overall difference in general of the pipe birefringent property indicating that this section of pipe may have manufacturing or extrusion differences.

Figure 19A:
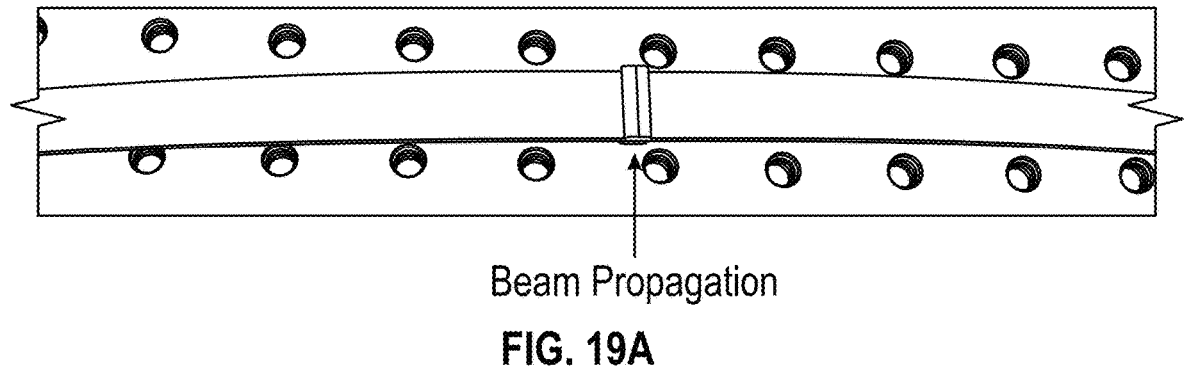
FIG. 19A shows a direction of beam propagation relative to a sample strip of butt fused pipe sections.
Figure 19B:
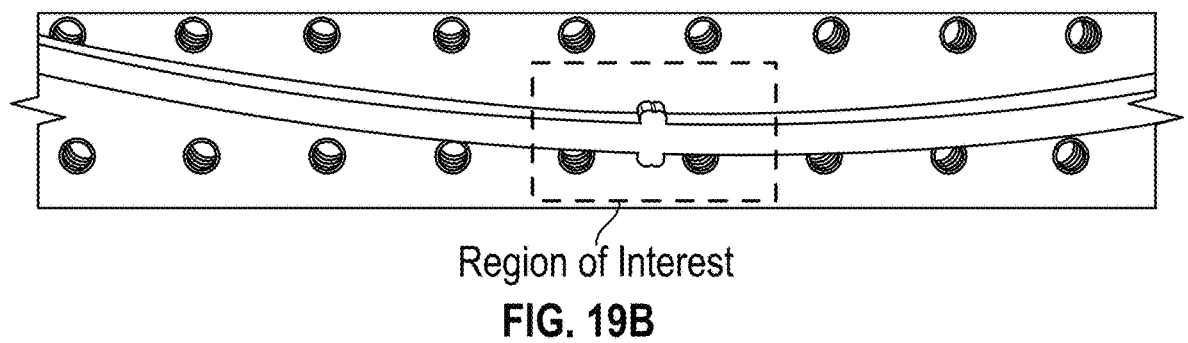
FIG. 19B shows a region of interest for imaging of stress in the sample strip.

FIG. 19A shows a direction of beam propagation relative to a sample strip of butt fused pipe sections, and FIG. 19B shows a region of interest for imaging of stress in the sample strip. The system 100 was therefore used to evaluate stress in strips of butt fused pipe sections. As shown in FIG. 19A, the thin strips enabled THz beam propagation substantially parallel to the outer pipe surface. This allowed imaging of the stress within the butt joint bevel, shown as the region of interest in FIG. 19B. Measurements were performed for MDPE samples with perfect pressure and over pressure, as well HDPE samples with perfect pressure and under pressure. Scans were performed in the transmission set-up and the time difference between vertical and horizontal THz pulse arrival times was calculated and imaged with MATLAB scripts.

Figure 20A:
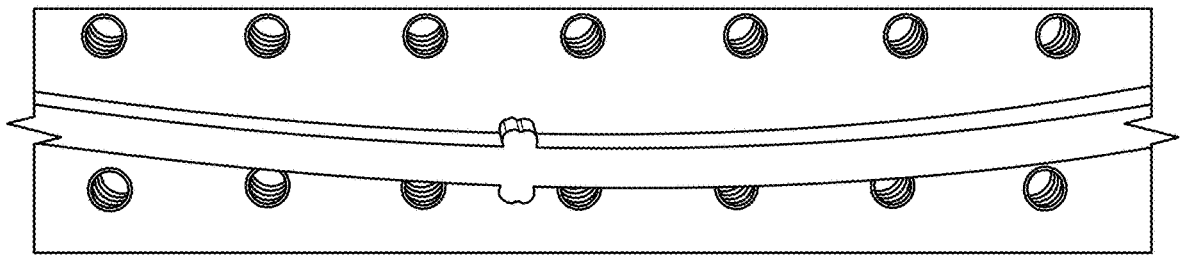
FIG. 20A shows an image of a sample strip of butt fused pipe sections.
Figure 20B:
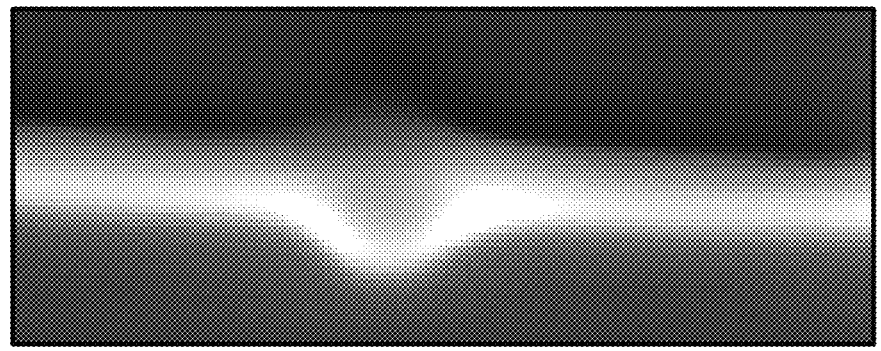
FIG. 20B shows a THz birefringence image of the sample's region of interest as oriented in the side view.

FIG. 20A shows an image of a sample strip of butt fused pipe sections, and FIG. 20B shows a THz birefringence image of the sample's region of interest as oriented in the side view. In particular, FIG. 20A shows a photograph of the sample from the side view. In such orientation, the direction of the THz beam was perpendicular to the page enabling measurements of stress inside of the butt fusion joint. In FIG. 20B, the white or light-colored pixels correspond to high birefringence and internal stress. Dark or black pixels correspond to low birefringence and internal stress. Similar to the previous experiment, the magnitude of the birefringence and stress increased as one approaches the butt fusion joint. However, inside the joint, the region of maximum stress appears to move towards the outer wall of the pipe. It is noted that the stress direction and magnitude can change rapidly over distances comparable to the width of the rollback bevel region.

Figure 21A:
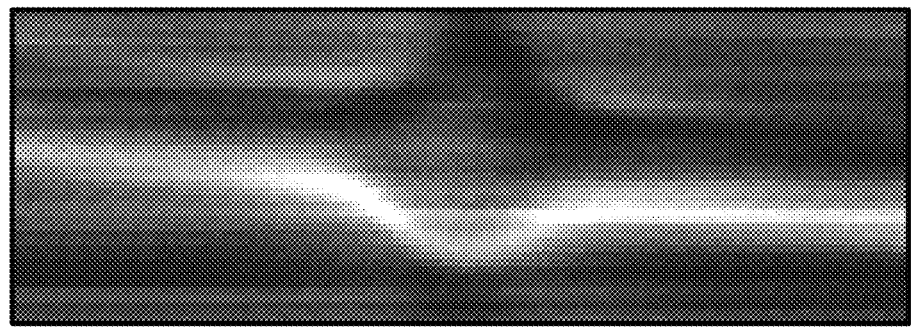
FIG. 21A-21D show THz birefringence measurements through a pipe, with FIG. 21A showing measurements for an HDPE light pressure pipe, FIG. 21B showing measurements for an HDPE perfect pressure pipe, FIG. 21C showing measurements for an MDPE perfect pressure pipe, and FIG. 21D showing measurements for an MDPE severe pressure pipe.
Figure 21B:
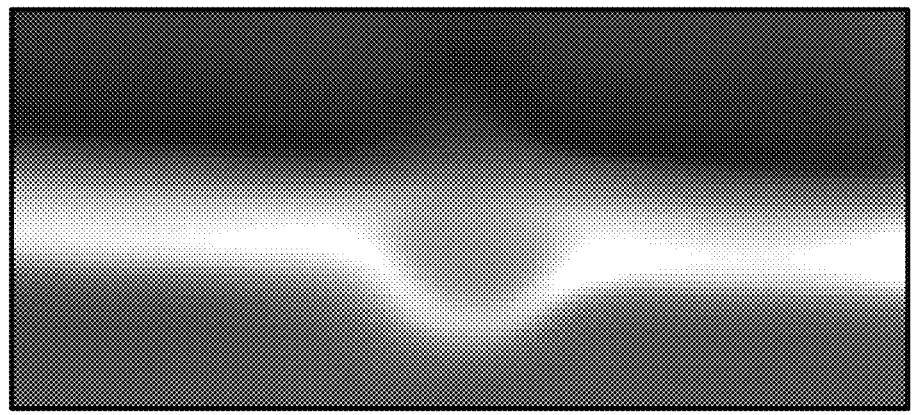
Figure 21C:
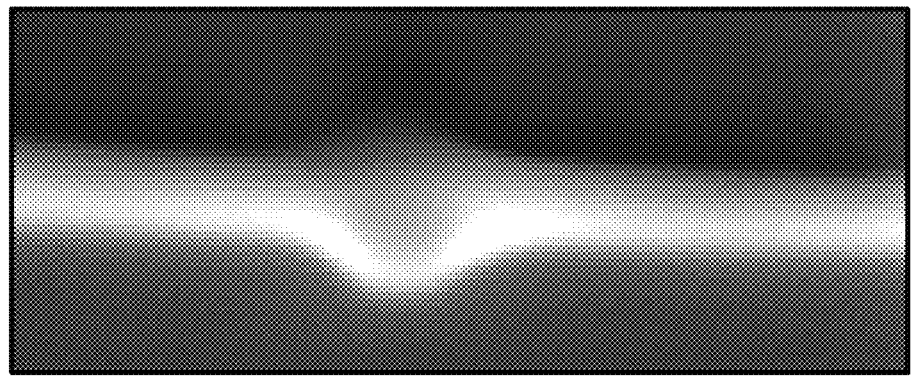
Figure 21D:
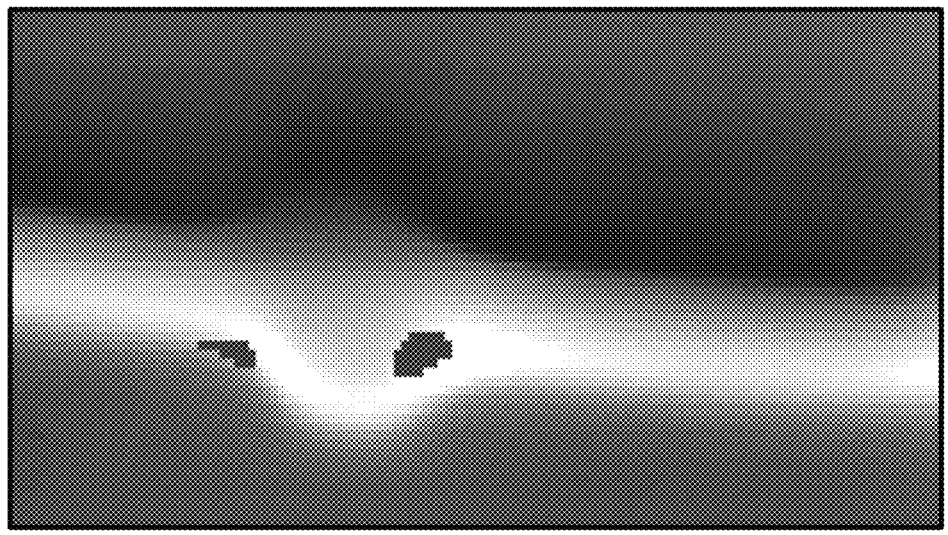

FIG. 21A-21D show THz birefringence measurements through a pipe, with FIG. 21A showing measurements for an HDPE light pressure pipe, FIG. 21B showing measurements for an HDPE perfect pressure pipe, FIG. 21C showing measurements for an MDPE perfect pressure pipe, and FIG. 21D showing measurements for an MDPE severe pressure pipe. The black blotches in FIG. 21D are anomalies in the calculated time difference values and should be ignored. THz birefringence images from HDPE and MDPE samples both at light, ideal, and over pressure exhibit many of the same trends as shown in FIGS. 21A-21D. In FIG. 21A, the magnitude of the birefringence and stress increases as one approaches the butt fusion joint. In FIG. 21B, the stress direction and magnitude changes rapidly over distances comparable to the width of the rollback bevel region. In FIG. 21C, inside the joint, the region of maximum stress appears to move towards to outer wall of the pipe. In FIG. 21D, regions of maximum stress (brightest pixels in FIG. 20B and FIGS. 21A-21D) appear not in the geometric center of the butt fusion joint, but rather to either side of the geometric center when the stress changes direction from being axially along the length of the pipe to following the rollback of the bevel.

The exemplary systems 100 can therefore use THz transmissions with prisms to scan around surface structures. The systems 100 can be used to image through a realistic joint topology and, in some embodiments, can be used for photoelastic stress measurements. Unlike detection of THz transmission intensity in traditional systems, the systems 100 measure differences in phase velocity due to polarization changes that are directly related to stress-induced birefringence. The THz imaging is also capable of clearly imaging and detection of damage information for fiber composite buried voids of 100 μm in size. THz has a higher resolution (as compared to ultrasound) for detection of small defects in PE pipes. THz transmission further provides more sensitivity (as compared to x-rays) in differentiating plastics or variations within plastic layers since the refractive index of plastics in the THz range varies significantly. The THz power levels used by the systems 100 are low, allowing for use of the systems 100 without special radiation safety or other handling training.

While exemplary embodiments have been described herein, it is expressly noted that these embodiments should not be construed as limiting, but rather that additions and modifications to what is expressly described herein also are included within the scope of the invention. Moreover, it is to be understood that the features of the various embodiments described herein are not mutually exclusive and can exist in various combinations and permutations, even if such combinations or permutations are not made express herein, without departing from the spirit and scope of the invention.

The invention claimed is:

1. A system for detecting stress-induced pipe defects, the system comprising:
    a transmitter oriented to transmit Terahertz (THz) waveform pulses towards at least one of an outer surface of a pipe or an inner surface of the pipe;
    a receiver oriented to receive reflected Terahertz (THz) waveform pulses from at least one of the outer surface of the pipe or the inner surface of the pipe;
    a first polarizing filter disposed adjacent to or associated with the transmitter, wherein the THz waveform pulses are transmitted from the transmitter through the first polarizing filter;
    a second polarizing filter disposed adjacent to or associated with the receiver, wherein the reflected THZ waveform pulses pass through the second polarizing filter prior to passage to the receiver; and
    a processing device configured to:
        receive as input (i) a parallel polarization measurement from the receiver with the second polarizing filter disposed in a parallel orientation relative to a central longitudinal axis of the pipe, and (ii) a perpendicular polarization measurement from the receiver with the second polarizing filter disposed in a perpendicular orientation relative to the central longitudinal axis of the pipe;
        determine that no intrinsic stress-induced pipe defect exists in the pipe if the parallel polarization measurement is equal to the perpendicular polarization measurement; and
        determine that an intrinsic stress-induced pipe defect exists in the pipe if the parallel polarization measurement is different from the perpendicular polarization measurement.

2. The system of claim 1, comprising a beamsplitter, the transmitter oriented to transmit the Terahertz (THz) waveform pulses through the beamsplitter, and the beamsplitter directing the Terahertz (THz) waveform pulses towards at least one of the outer surface of the pipe or the inner surface of the pipe.

3. The system of claim 1, wherein the processing device is configured to detect a transmitted amplitude of the Terahertz (THz) waveform pulses transmitted from the transmitter and a received amplitude the reflected Terahertz (THz) waveform pulses received by the receiver, and detect a difference between the transmitted amplitude and the received amplitude, such difference indicative of a detected surface defect in the pipe.

4. The system of claim 1, wherein the transmitter is oriented to transmit the Terahertz (THz) waveform pulses substantially perpendicularly relative to the outer surface of the pipe or the inner surface of the pipe, and the receiver is oriented to receive the reflected Terahertz (THz) waveform pulses substantially perpendicularly relative to the outer surface of the pipe or the inner surface of the pipe.

5. The system of claim 1, comprising a rotatable platform for rotating the pipe about a central longitudinal axis of the pipe, wherein the rotatable platform is mechanically rotated to detect surface defects in different surface areas of the pipe.

6. The system of claim 1, wherein the first polarizing filter is a first rotatable polarizing filter, and the second polarizing filter is a second rotatable polarizing filter.

7. The system of claim 1, wherein the processing device is configured to generate a stress map of the pipe to visualize birefringence changes based on the parallel polarization measurement and the perpendicular polarization measurement.

8. The system of claim 1, wherein the transmitter is oriented to transmit the Terahertz (THz) waveform pulses towards a butt weld joint on the outer surface of the pipe or the inner surface of the pipe.

9. The system of claim 8, wherein the transmitter is oriented to transmit the Terahertz (THz) waveform pulses at a non-perpendicular angle relative to the outer surface of the pipe or the inner surface of the pipe, and the receiver is oriented to receive the reflected Terahertz (THz) waveform pulses at a non-perpendicular angle relative to the outer surface of the pipe or the inner surface of the pipe.

10. The system of claim 9, wherein the processing device is configured to receive as input a transmitted amplitude of the Terahertz (THz) waveform pulses transmitted from the transmitter and a received amplitude the reflected Terahertz (THz) waveform pulses received by the receiver, and detect a difference between the transmitted amplitude and the received amplitude, such difference indicative of a detected defect in the butt weld joint of the pipe.

11. The system of claim 8, comprising a first prism and a second prism disposed on the outer surface of the pipe on opposing sides of the butt weld joint, at least one of the first prism or the second prism directing the transmitted Terahertz (THz) waveform pulses through the butt weld joint.

12. The system of claim 11, comprising a matching refractive index substance disposed between at least one of the first prism or the second prism and the outer surface of the pipe to eliminate or reduce air gaps between the first or second prism and the pipe.

13. The system of claim 11, comprising a metal inset disposed along one or more surfaces of the first prism or the second prism, the metal inset isolating and reducing back reflection of the transmitted Terahertz (THz) waveform pulses.

14. A method of detecting stress-induced pipe defects, comprising:

transmitting Terahertz (THz) waveform pulses with a transmitter towards at least one of an outer surface of a pipe or an inner surface of the pipe, wherein a first polarizing filter is disposed adjacent to or is associated with the transmitter and the THZ waveform pulses are transmitted from the transmitter through the first polarizing filter;

receiving reflected Terahertz (THz) waveform pulses with a receiver from at least one of the outer surface of the pipe or the inner surface of the pipe, wherein a second polarizing filter is disposed adjacent to or is associated with the receiver and the reflected THZ waveform pulses pass through the second polarizing filter prior to passage to the receiver;

receiving as input at a processing device (i) a parallel polarization measurement from the receiver with the second polarizing filter disposed in a parallel orientation relative to a central longitudinal axis of the pipe, and (ii) a perpendicular polarization measurement from the receiver with the second polarizing filter disposed in a perpendicular orientation relative to the central longitudinal axis of the pipe; and determining with the processing device that (i) no intrinsic stress-induced pipe defect exists in the pipe if the parallel polarization measuring is equal to the perpendicular polarization measurement, or (ii) an intrinsic stress-induced pipe defect exists in the pipe if the parallel polarization measurement is different from the perpendicular polarization measurement.

15. The method of claim 14, comprising detecting a transmitted amplitude of the Terahertz (THz) waveform pulses transmitted from the transmitter and a received amplitude the reflected Terahertz (THz) waveform pulses received by the receiver, and detecting a difference between the transmitted amplitude and the received amplitude, such difference indicative of a detected surface defect in the pipe.

16. The method of claim 14, comprising transmitting the Terahertz (THz) waveform pulses with the transmitter towards a butt weld joint on the outer surface of the pipe or the inner surface of the pipe, receiving as input a transmitted amplitude of the Terahertz (THz) waveform pulses transmitted from the transmitter and a received amplitude the reflected Terahertz (THz) waveform pulses received by the receiver, and detecting a difference between the transmitted amplitude and the received amplitude, such difference indicative of a detected defect in the butt weld joint of the pipe.

17. A non-transitory computer-readable medium storing instructions for detecting stress-induced pipe defects, wherein execution of the instructions by the processing device causes the processing device to:

transmit Terahertz (THz) waveform pulses with a transmitter towards at least one of an outer surface of a pipe or an inner surface of the pipe, wherein a first polarizing filter is disposed adjacent to or is associated with the transmitter and the THZ waveform pulses are transmitted from the transmitter through the first polarizing filter;

receive reflected Terahertz (THz) waveform pulses with a receiver from at least one of the outer surface of the pipe or the inner surface of the pipe, wherein a second polarizing filter is disposed adjacent to or is associated with the receiver and the reflected THZ waveform pulses pass through the second polarizing filter prior to passage to the receiver;

receive as input at the processing device (i) a parallel polarization measurement from the receiver with the second polarizing filter disposed in a parallel orientation relative to a central longitudinal axis of the pipe, and (ii) a perpendicular polarization measurement from the receiver with the second polarizing filter disposed in a perpendicular orientation relative to the central longitudinal axis of the pipe; and determine with the processing device that (i) no intrinsic stress-induced pipe defect exists in the pipe if the parallel polarization measuring is equal to the perpendicular polarization measurement, or (ii) an intrinsic stress-induced pipe defect exists in the pipe if the parallel polarization measurement is different from the perpendicular polarization measurement.

\* \* \* \* \*

UNITED STATES PATENT AND TRADEMARK OFFICE
CERTIFICATE OF CORRECTION

| | |
|---|---|
| PATENT NO. | : 11,709,139 B2 |
| APPLICATION NO. | : 17/354389 |
| DATED | : July 25, 2023 |
| INVENTOR(S) | : John F. Federici et al. |

It is certified that error appears in the above-identified patent and that said Letters Patent is hereby corrected as shown below:

On the Title Page

In item (72), please replace the current inventor's name "JOSEPH MAILLIA" with the following corrected name:
--JOSEPH MALLIA--

Signed and Sealed this
Nineteenth Day of September, 2023

Katherine Kelly Vidal
*Director of the United States Patent and Trademark Office*